United States Patent [19]
Larkin et al.

[11] Patent Number: 5,974,273
[45] Date of Patent: *Oct. 26, 1999

[54] METHOD AND APPARATUS FOR CONTROLLING A REMOTE LIGHT SOURCE

[75] Inventors: Eric Larkin, Palo Alto; Michael Topolovac, Pebble Beach, both of Calif.

[73] Assignee: Light & Motion Industries, Inc., Monterey, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/771,957

[22] Filed: Dec. 23, 1996

[51] Int. Cl.$^6$ ..................................................... G03B 17/24
[52] U.S. Cl. ........................ 396/162; 396/171; 396/182; 396/198; 396/267
[58] Field of Search .................................... 396/171, 182, 396/267, 160, 162, 180, 189, 194, 198

[56] References Cited

U.S. PATENT DOCUMENTS

| | | | |
|---|---|---|---|
| 3,776,112 | 12/1973 | Wilwerding | 396/160 |
| 3,917,944 | 11/1975 | Eisenberger et al. | 396/171 |
| 4,252,426 | 2/1981 | Kuraishi | 396/267 |
| 5,016,037 | 5/1991 | Taniguchi et al. | 396/182 |
| 5,239,602 | 8/1993 | Hunsberger et al. | 385/62 |

FOREIGN PATENT DOCUMENTS 55-036829 A2   3/1980   Japan .............................. G03B 15/05

OTHER PUBLICATIONS

"Low Cost Fiber–Optic Links for Digital Applications up to 155 MBd," Application Bulletin 78, Hewlett–Packard, pp. 1–19.

*Primary Examiner*—David M. Gray
*Attorney, Agent, or Firm*—Carr & Ferrell LLP

[57] ABSTRACT

A method and apparatus for activating a remote light source in synchronization with an indication provided from a camera. A transducer is coupled to the external electrical connector of a conventional camera in order to convert the electrical signals that are output from the camera into an alternative form (e.g., optical signals). A different transducer is coupled to the external electrical connector of a remote light source, such as a photographic strobe. The light source transducer receives the signal from the camera transducer and converts the signal back into one or more conventional electrical signals to activate the remote light source. A light source activation signal and a light source modulation signal are multiplexed onto a single communication channel. A first indication is provided on the communication channel to activate the remote light source (i.e., cause the light source to emit light). A second indication is preferably provided on the communication channel in response to signals generated by a photo-detector within the camera. The second indication causes the remote light source to modulate its emission of light. The multiplexing camera transducer and demultiplexing light source transducer may be housed within the camera and remote light source, respectively. A Slave remote light source, coupled to a Slave light source transducer is activated by detecting when either a Master remote light source or a local light source has been activated. An open end of an optical conductor that is coupled to a Slave light source transducer is directed in such a way as to be illuminated by the Master remote light source or local light source.

21 Claims, 14 Drawing Sheets

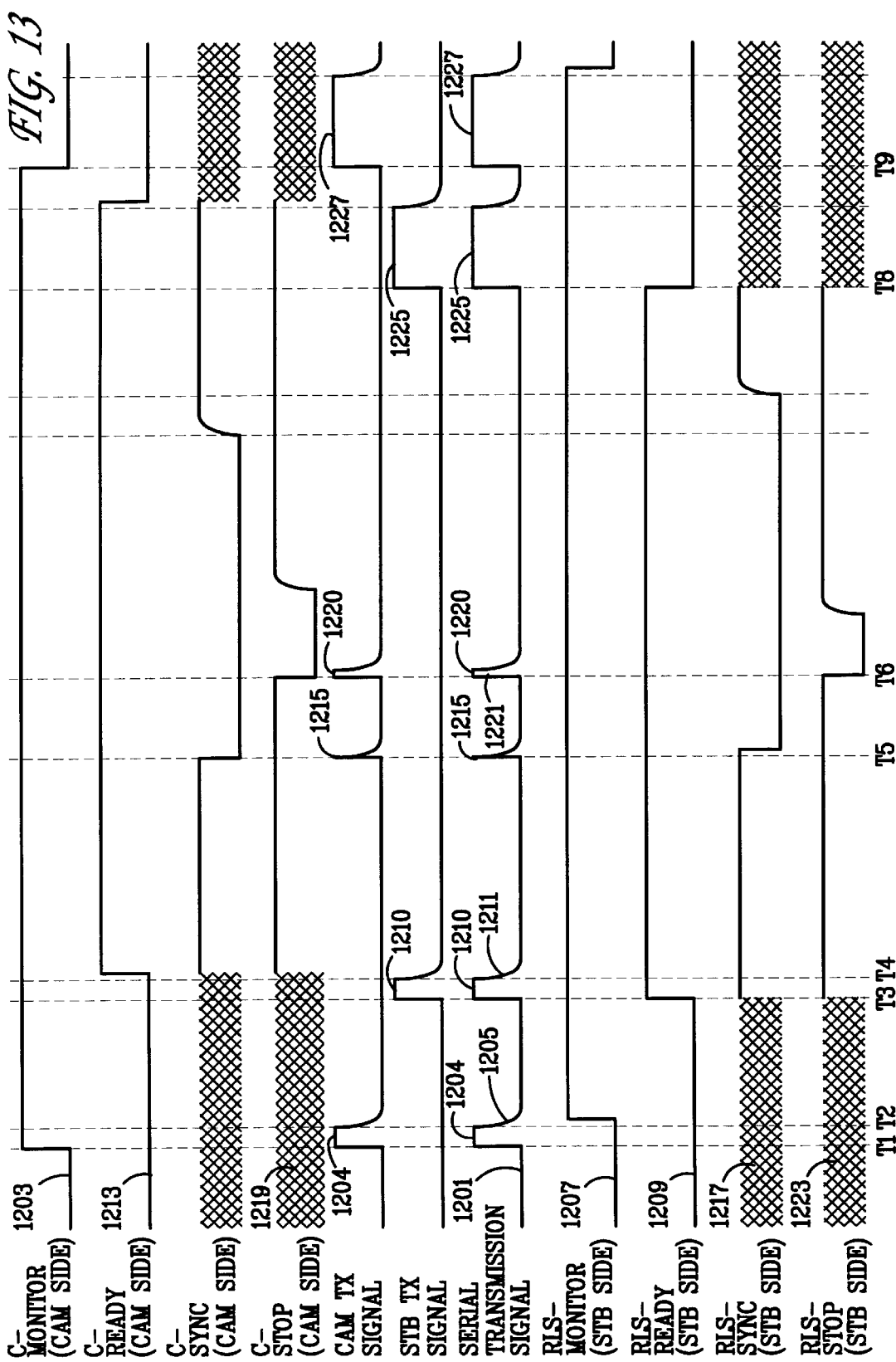

METHOD AND APPARATUS FOR CONTROLLING A REMOTE LIGHT SOURCE

BACKGROUND OF THE INVENTION

1. Field of the Invention

This invention relates to external lighting devices for use with still cameras, and more particularly to a method and apparatus for coupling a remote light source to a still camera and for activating and preferably modulating the remote light source.

2. Description of Related Art

Still cameras are frequently used with artificial light sources, such as flash or strobe units, in order to provide more or different light than is naturally available. In most amateur photography, the photographer uses a single strobe that is directly attached to a camera. However, there are many situations in which photographers use one or more strobes that are physically remote from the camera. Studio photographers frequently use several highpowered strobes positioned at remote locations with respect to the camera in order to provide a desired direction, color, and quality of light to the subject. Similar techniques are used by photographers who are photographing large or distant outdoor subjects. Furthermore, because of the light filtering qualities of water, it is customary to use remote strobes in underwater photography. Underwater strobes are almost universally sealed in a watertight enclosure that is separate and apart from the enclosure in which the associated camera is sealed. In all these situations, a communication link must be established between the camera and each associated strobe in order to synchronize the triggering of the strobe to the activation of the shutter of the associated camera.

Communication between a camera and remote strobe is commonly provided by a multi-conductor electrical cable having an electrical connector at each end. Such a cable is commonly referred to as a "SYNC" cord. FIG. 1 is an illustration of a conventional camera 101 and a strobe 102 connected by a conventional SYNC cord 107. One end of the SYNC cord 107 mates with an electrical connector 103 provided on the housing of the camera 101. The other end of the SYNC cord 107 mates with an electrical connector 105 provided on the housing of the strobe 102. Some prior art strobes are provided with a SYNC cord having only one connector at the distal end for connecting to the housing of a camera. The other end is fixed to the strobe (e.g., attached by solder).

In accordance with one prior art scheme for triggering a remote strobe, the SYNC cord 107 has two wires. The first wire conducts a SYNC signal. The second wire serves as a GROUND return path. The SYNC signal is commonly controlled using an "open collector" protocol. The open collector output for the SYNC signal is "pulled-up" by a resistor coupled to a voltage source. The SYNC signal is shorted to ground to trigger the strobe. This simple scheme allows a mechanical switch to trigger a strobe. The mechanical switch may be mechanically coupled to the shutter of the camera. This scheme also allows the low-cost analog signal processing in the strobe. Furthermore, this scheme allows a plurality of strobes to be connected in parallel and triggered at once. Still further, the propagation delay between initiation of the command to trigger the strobe and receipt of the command at the strobe which results from this scheme is very small (on the order of 3 to 4 microseconds).

One problem with the above described system is that while the camera 101 controls the time at which the strobe 102 is triggered, there is no control from the camera over the amount of light the strobe 102 generates. In the mid-1980's, a system was introduced for triggering remote strobes. In accordance with this new system, the strobe is turned off when the film plane has accumulated an appropriate amount of light (as determined by the type of film used and the settings on the camera). Typically, a photo-sensor (photo-integrator) built into the camera is focused on the film plane to determine the amount of light received. When sufficient light has been received on the film plane, a stop signal is sent from the camera to the strobe, causing the strobe to turn off. Such a system is commonly referred to as a TTL ("through the lens") exposure control system. TTL exposure control systems require a STOP wire in addition to the GROUND wire and SYNC wires discussed above. The STOP signal is transmitted by an open collector protocol similar to the protocol used with the SYNC signal. Use of an open collector STOP signal allows multiple strobes to be controlled by the same STOP signal. As noted above; such open collector control has relatively short propagation delay when the STOP wire is shorted to the GROUND wire. Using a third separate wire to communicate the STOP signal provides full backward compatibility with two wire "non-TTL" cameras. In addition, there are significant manufacturing economies which result from isolating the TTL exposure control functionality from the SYNC functionality, since the camera or strobe may easily be made in two versions: one which includes TTL functionality, and the other which does not.

Many cameras currently use a protocol which also includes a READY signal sent from the strobe 102 to the camera 101. The READY signal permits the camera 101 (and the photographer, if the camera has a suitable display in its view finder) to know whether the strobe 102 is ready to be triggered. Unlike the SYNC and STOP signals, which are edge-triggered, the READY signal is a simple active-high logic signal. That is, the strobe 102 pulls the READY line high when it is in the "READY" state (i.e., the strobe is fully charged and ready to be triggered), and leaves it low when it is not ready (i.e., it is either off or is not fully charged).

In situations in which a photographer is using multiple strobes attached to one camera, the READY signal from only one strobe is transmitted to the camera. Accordingly, information regarding the status of the other strobes is not available to the camera. Therefore, the photographer must look at each other strobe to determine whether those strobes are ready to be triggered.

A fifth signal is also commonly used in cameras having TTL exposure control. The fifth (MONITOR) signal is an active-high current signal (as opposed to a voltage signal). The MONITOR signal indicates to the strobe that the camera is "awake" and that a pulse on the SYNC signal may be forthcoming. Typically, a camera begins transmitting the MONITOR signal when the photographer has partially depressed the shutter button. The camera continues transmitting the MONITOR signal for some period of time afterwards (usually between 10 seconds and 1 minute).

One problem that exists with prior art systems is the lack of a mechanical standard for interfacing a SYNC cord with a camera and remote light source. While the connectors on the camera side of a SYNC cord are reasonably standard, each manufacturer uses its own mechanically different connector to attach the SYNC cord to a remote light source. Because each manufacturer has a different mechanical standard, different SYNC cords are required for use with different manufacturers' strobes.

Even on the camera side, the standardization of the mechanical interface is not complete. Some camera manufacturers use a unique SYNC cord mechanical interface. Therefore, different SYNC cords may be required for different cameras as well. This lack of standardization makes it necessary for a photographer who owns strobes from more than one manufacturer to purchase at least one SYNC cord for each type of strobe he owns. This represents a considerable expense, since each SYNC cord is relatively expensive (e.g., approximately $75.00 each for underwater SYNC cords, and as much as $100 to $200 for above-water TTL sync cords). Furthermore, a photographer who owns a camera from a manufacturer that uses a non-standard interface is generally forced to purchase strobes made only by that manufacturer. Still further, above-water TTL SYNC cords are available in relatively short lengths (up to about 10 feet) and are quite bulky due to the heavy shielding necessary to prevent false-triggering of the strobe's STOP circuit by the pulse of electromagnetic noise that is created when a strobe is triggered. Still further, a photographer who wishes to use more than one strobe (particularly in an underwater setting) must purchase a "dual" SYNC cord in order to interface one camera to two strobes. While most underwater strobe manufacturers make "dual" SYNC cords (which are even more expensive than single cords), all manufacturers use their own connectors on the strobe ends of the dual SYNC cords they sell, making it difficult, and in most cases impractical, to combine strobes from different manufacturers in a single system. Using more than two strobes underwater requires additional, specialized hardware, since manufacturers of underwater equipment do not offer triple SYNC cords as a standard product. Above water, similar problems are encountered. Very few, if any, commercial products exist which permit the photographer to use TTL exposure control with multiple remote strobes in an above-water setting. Instead, the photographer is forced to rely on SYNC-only triggering of multiple strobes, either through two-wire electrical connections or by using the strobes in "slave" mode, as described below.

One common way to address the problem of using multiple strobes is to have one strobe attached to a camera via a single SYNC cord and to have a second strobe triggered in "slave" mode. In slave mode, a photo-sensor in the second strobe is used to detect a burst of light emitted from the first strobe. The photo-sensor then triggers the second strobe in response to detection of the burst of light. By operating strobes from different manufacturers in slave mode, the difficulties which result from each manufacturer having a different mechanical interface is eliminated. In addition, this system allows a relatively large number of strobes to be used. However, slave triggering of a strobe is notoriously unreliable, both with regard to false triggering and failure to trigger, since the illumination of a photo-sensor in the second strobe is typically indirect (e.g., both strobes are typically pointing at the subject). In addition, few if any commercially available strobes permit TTL exposure control to be used in slave mode.

Another disadvantage of prior art systems is the reliability of the SYNC cord. That is, the reliability of the system will be compromised by any of a number of mechanical failures, all of which occur relatively frequently. In underwater systems, a common problem is the breach of the watertight seal between the cable and the strobe or camera. Failure of a watertight seal in an underwater camera or strobe will likely result in the destruction of either the camera, the strobe, or both. Well-designed watertight seals typically have a high reliability if the SYNC cord is not removed from the camera and the strobe frequently. Unfortunately, in practice, a photographer frequently disconnects the SYNC cord from the camera and the strobe for ease of transportation, and to change camera and strobe configurations. In the case of both underwater and outdoor photographers, this is often done in a moist environment, thus decreasing the reliability of the electrical connections between the camera and strobe. Each time the connection between the SYNC cord and either the camera or strobe is broken, particularly in a moist environment, there is a chance that the electrical connection between the pins and sockets that make up the individual contacts of the connectors will become corroded, resulting in electrical failure of the SYNC cord. In addition, conventional SYNC cords are susceptible to breakage of the wire inside the cable due to stress of use. Furthermore, flooding of the cable itself (through the insulating jacket) due to wear or misuse is common in underwater applications.

A further disadvantage of prior art systems is inability to reconfigure the system underwater or in harsh environments. Any attempt to disconnect a SYNC cord from either the strobe or camera underwater would breach the integrity of the watertight seals in the system. Furthermore, conventional SYNC cords are relatively bulky and heavy, making transportation and storage inconvenient, particularly in the case in which several SYNC cords are required.

Still further, conventional SYNC cords are of a relatively short and fixed length and cannot be adjusted or made to a specific length in the field without soldering or crimping electrical conductors to pins and/or sockets of the connector.

Still further, conventional SYNC cords are expensive to manufacture and purchase. The connectors at either end of the SYNC cord typically consist of many small pins and/or sockets which must be soldered or crimped to the ends of the individual wires, and then inserted into a metal connector body which is overmolded onto the end of the cable. Particularly for above-water sync cords, the cable used for this purpose must be heavily shielded to ensure proper operation of the TTL exposure control in spite of the electromagnetic emissions caused by the discharge of the strobe's capacitors. In addition to the expense of the SYNC cords themselves, the inclusion of the mating connector on the camera and strobe adds to the expense of the overall system. In fact, in order to reduce costs, manufacturers sometimes omit the connector on the strobe side, thus sacrificing convenience and reliability to reduce costs.

FIG. 2 is an illustration of one system available today in which the problem of connecting and disconnecting SYNC cords underwater is overcome by providing a SYNC cord 200 having optical linkage modules 201, 203. For example, one product has an optical transmitter unit 201 on one end of a first long cable 205. The other end of the first cable 205 is attached to a camera 101 using the conventional electrical connector 103 provided on the camera 101. A receiver unit 203 is coupled by a long electrical cable 207 to the connector 105 for making electrical connections to a strobe. The first and second cables 205, 207 are coupled together by directly interfacing the optical receiver unit 203 and transmitter unit 201. Alternatively, the optical receiver unit 203 may be coupled to two long cables for connecting to two strobes. These cables 205, 207 are heavy and bulky. The transmitter unit 201 and receiver unit 203 each have two separate optical transmitter/receiver pairs, one dedicated to transmitting the SYNC signal and the other dedicated to transmitting the STOP signal. Each channel consists of an LED (light emitting diode) and a photo-detector. The LED and photo-detector have optically isolated line-of-sight contact through transparent windows in the transmitter unit 201 and receiver unit 203, respectively. This system does not address many of the reliability issues associated with the use of electrical cables underwater. Further, it relies on the surrounding water and physical distance of the optical modules from the strobe to shield the modules from unwanted electromagnetic interference.

Another system for use underwater is disclosed in Japanese Publication No. JP 55036829 filed in the name of Mamiya Koki Kk (the "Mamiya" patent). The Mamiya patent discloses an underwater camera 1 and underwater strobe 2 connected by a light guide 3, as shown in FIG. 3. A watertight light-emitting window 7 integrated into the camera directs light through an optical connector 4 into the light guide 3 when the light guide 3 is coupled to the camera 1. Connectors 4 are fixed at each end of the light guide to allow the light guide 3 to be coupled to the camera 1 and strobe 2. A light-receiving element 10 integrated into the strobe 2 receives the light which traverses the light guide 3. Upon receiving the light emitted by the camera 1 and transmitted through the connectors 4 and light guide 3, the strobe 2 is triggered. Since the connection between the light guide 3 and the camera 1 and between the light guide 3 and the strobe 2 are water tight, the camera 1 and strobe 2 can be disconnected from the light guide 3 while underwater. However, this system can only be used with cameras and strobes that have the watertight optical connectors 4 required to interface with the light guide 3. Furthermore, the use of connectors 4 on either end of the light guide 3 fixes the length of the light guide 3 at the time of manufacture. In addition, this system does not provide any way for multiple strobes to be used. Still further, this system does not permit TTL exposure control.

Accordingly, there is a need for a SYNC cord that can be used to transmit TTL signals between a camera and strobe in a manner which allows the camera and strobe system to be reconfigured (e.g., allows the SYNC cord to be disconnected from the camera and strobe underwater or in harsh environments). Furthermore, there is a need for a small lightweight SYNC cord for coupling TTL signals between a camera and strobe. Still further, there is a need for a more reliable SYNC cord. Still further, there is a need for a SYNC cord which has the above-mentioned features and which does not require any change in the design or manufacture of conventional cameras and strobes. Furthermore, there is a need for a SYNC cord which permits convenient simultaneous use of strobes from different manufacturers. Still further, there is a need for a system which allows a relatively large number of strobes to be reliably triggered by a single camera. Furthermore, there is a need for an inexpensive SYNC cord for transmitting TTL signals between a camera and a strobe. Still further, there is a need for a SYNC cord which can be adjusted in length by the user in the field. Furthermore, there is a need for a TTL sync cord with a greater maximum usable length. The present invention provides a SYNC cord which satisfies these needs.

SUMMARY OF THE INVENTION

The present invention is a method and apparatus for triggering and preferably modulating a remote light source in response to one or more indications provided from a camera. In accordance with one embodiment of the present invention, a multiplexing transducer is coupled to the external electrical connector of a conventional camera in order to convert the electrical signals that are output from the camera into an alternative form. Another different transducer, or demultiplexing transducer, is coupled to the external electrical connector of a conventional remote light source, such as a photographic strobe. One or more electrical signals from the camera are converted by the camera transducer and transmitted to the strobe transducer, which converts the signal or signals back into conventional electrical form, thereby activating and preferably modulating the remote light source.

The transducers are preferably coupled together by a thin, light, single conductor plastic optical waveguide. However, in other embodiments multiple conductor optical waveguide may be used, or radio-frequency communication may be used, or, in systems that are capable of modulating the remote light source, two-conductor electrical wire may be used. Therefore, the present invention significantly reduces the size, and cost of "SYNC" cords used to couple a remote light source to a camera, and increases the reliability of such cords. Furthermore, the optical ports through which the cable interfaces with the transducers are sealed to allow the user to make and break the optical connection in spite of harsh conditions, including being submerged underwater. Furthermore, the use of a single conductor plastic optical waveguide and the use of optical ports in the transducers that interface directly with an open end of an optical conductor allows the user to alter the length of the cable by simply cutting the cable to any desired length. The newly cut open end can preferably be mated to the optical port of either transducer. Furthermore, the present invention permits the convenient simultaneous use of multiple light sources from different manufacturers. In addition, the present invention increases the maximum usable length of modulating SYNC cords. Furthermore, the present invention permits all the above-mentioned improvements in performance without modification to the design of the camera or the light source.

In accordance with one embodiment of the present invention, the optical transmitter is housed within the camera and the optical receiver is housed within the light source, and both a signal to initiate light emission and a signal to modulate light emission are transmitted via one or more optical waveguides.

The camera may be coupled to a plurality of light sources in either a "star" configuration or a "daisy chain" configuration. In accordance with a star configuration, the transducer at the camera side of the optical conductor has at least as many ports as there are light sources to be coupled to the camera. In accordance with the daisy chain configuration, at least n−1 light sources have transducers that have a first port for receiving signals which originate at the camera and for transmitting signals back to the camera, and a second port for relaying signals which originated at the camera to a next light source and for relaying signals received from the next light source back to the camera. The number of light sources that can be daisy chained depends upon the ability of the transducers within the light sources to relay the signals without degradation in the quality of the signals to be relayed.

In addition, in accordance with one embodiment of the present invention, a signal to initiate light emission and a signal to modulate light emission are multiplexed onto a single communication channel. The communication channel is preferably a thin, light, single conductor optical waveguide, though in other embodiments it may be a two-conductor electrical connection or a single-channel wireless (electromagnetic) communication system. A first indication is provided on the conductor to cause the remote light source to trigger (i.e., to emit light). A second indication is preferably provided on the conductor in response to a photo-detector within the camera. The second indication causes the remote light source to modulate its emission of light. The multiplexing transmitter and demultiplexing receiver may be housed within the camera and remote light source, respectively.

In addition, in accordance with one embodiment of the present invention, a Slave remote light source, coupled to a Slave receiver, is triggered by detecting when either a Master remote light source or a local light source has been triggered. An open end of an optical conductor that is coupled to a Slave receiver is directed either at an object to be illuminated by the Master remote light source, or is directed at the Master remote light source itself In the case in which a Master remote light source is used, a Master receiver, coupled to the Master remote light source, is preferably triggered by a direct connection to a camera. The Slave receiver detects when the Master remote light source has been triggered by detecting light which traverses the optical conductor from the open end of the conductor to the Slave receiver. Any number of such Slave receivers can be coupled to an equal number of optical conductors, each with an open end directed in such a way as to be illuminated by the Master remote light source. In this way, each remote light source can face any direction, and be any distance from the Master remote light source and still be assured of detecting light emitted by the Master remote light source.

BRIEF DESCRIPTION OF THE DRAWING

The objects, advantages, and features of this invention will become readily apparent in view ofthe following description, when read in conjunction with the accompanying drawing, in which:

FIG. 5b is a cross-sectional view of the embodiment of the transmitter shown in FIG. 5a.

FIG. 5c is an exploded view of the component parts of the transmitter shown in FIG. 5a.

FIG. 6b is a cross-sectional view of the receiver shown in FIG. 6a.

FIG. 13 is a timing diagram of an embodiment of the present invention that provides for communication of the MONITOR and READY signals on a serial transmission signal.

Like reference numbers and designations in the various drawings refer to like elements.

DETAILED DESCRIPTION OF THE INVENTION

Throughout this description, the embodiments shown are provided merely as exemplars of, rather than limitations on, the present invention.

Overview

The present invention is a method and apparatus for causing a remote light source, such as a remote photographic strobe, to emit light in response to a signal from a camera. In accordance with one embodiment of the present invention, the remote light source is also modulated in response to a signal from the camera.

Transmitters and Receivers for Use with Conventional Camera and Strobe

Figure 1:
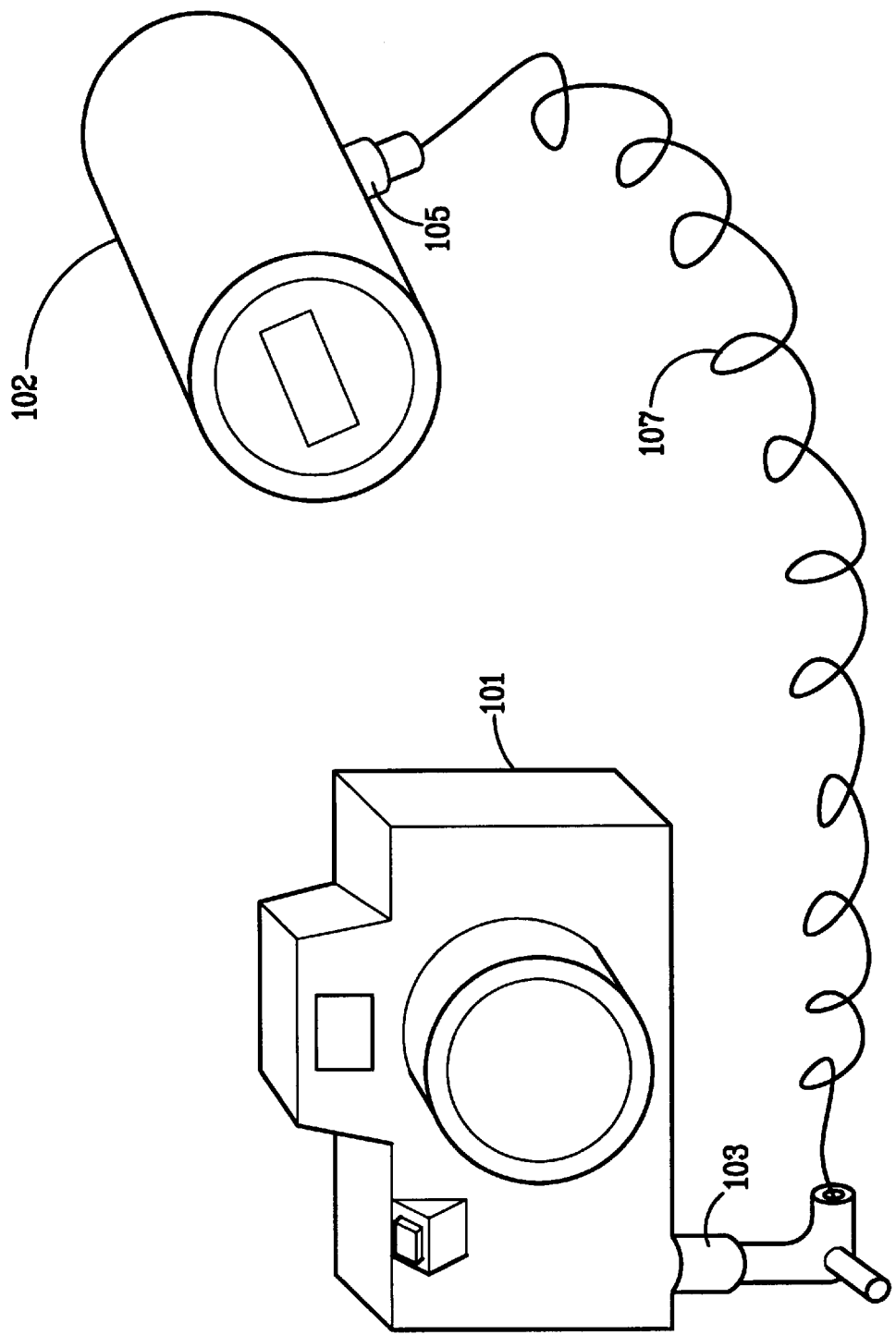
FIG. 1 is an illustration of a conventional prior art camera and strobe connected by a prior art SYNC cord.
Figure 2:
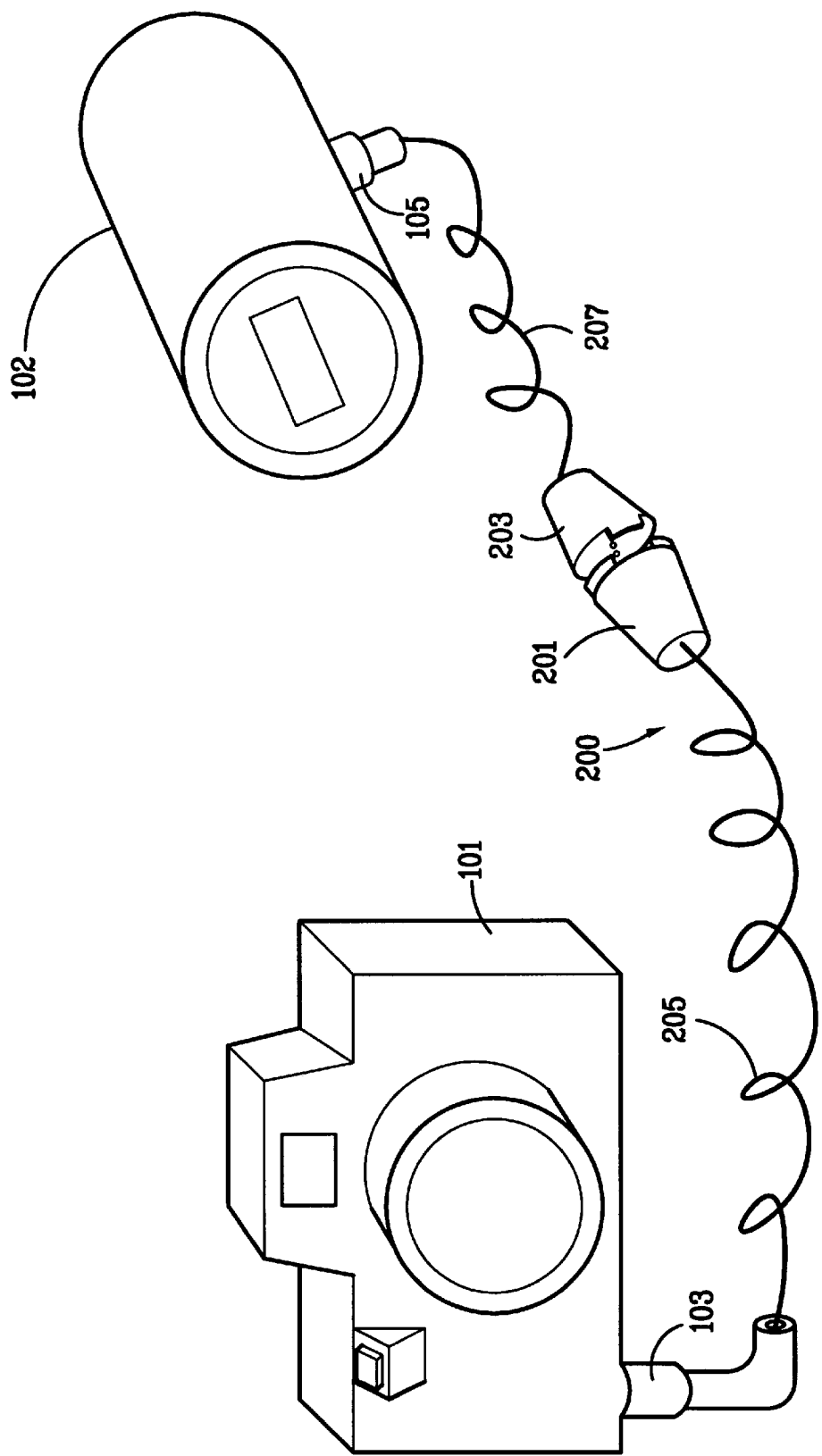
FIG. 2 is an illustration of one prior art system in which the problem of connecting and disconnecting SYNC cords underwater is overcome by providing a SYNC cord with optical linkage modules.
Figure 3A:
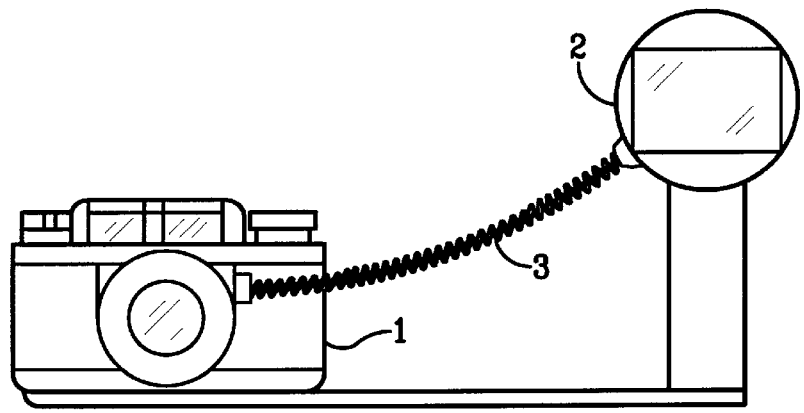
FIGS. 3a and 3b illustrate a prior art underwater camera and underwater strobe connected by a light guide.
Figure 3B:
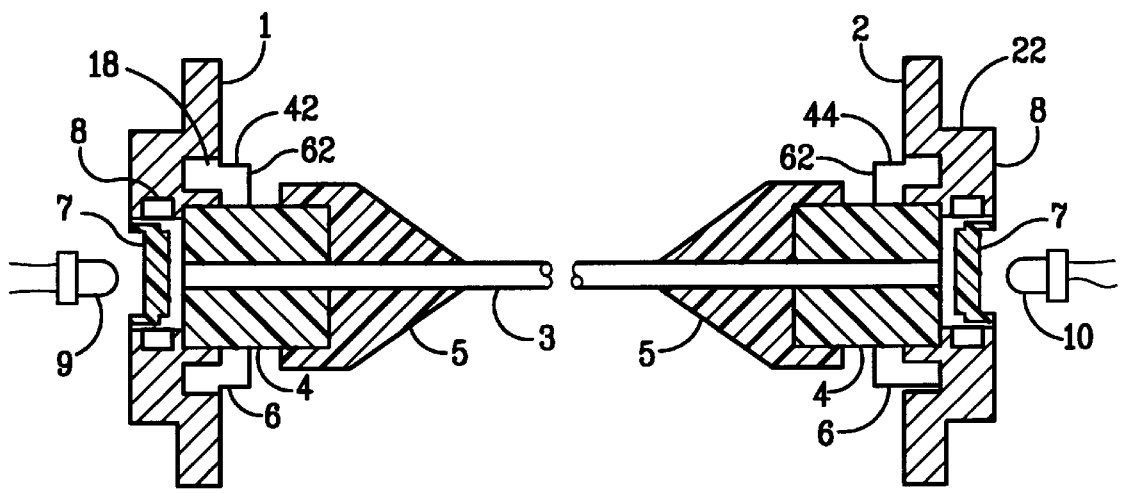
Figure 4:
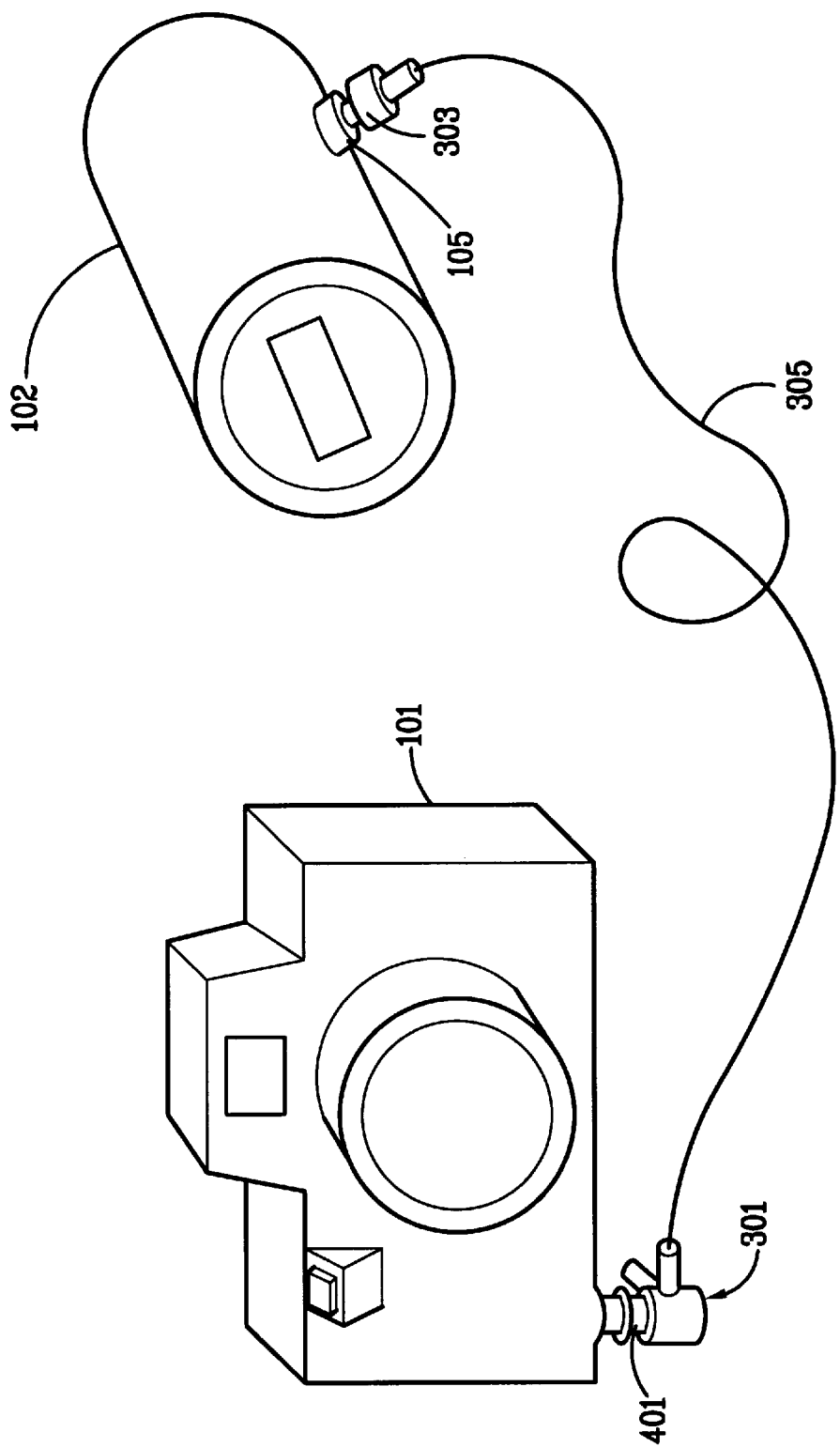
FIG. 4 is an illustration of a camera and remote light source connected in accordance with one embodiment of the present invention.

Many conventional cameras and remote light sources, such as the prior art camera 101 and the remote light source 102 shown in FIGS. 1 and 2, include conventional electrical connectors 103, 105 that allow the camera 101 to be electrically coupled to the remote light source 102 by either a multi-conductor electrical cable 107, as shown in FIG. 1 or by a cable assembly that includes multi-conductor electrical cables coupled to optical transmitters and receivers. A transmitter 301, as shown in FIG. 4, is provided in accordance with one embodiment of the present invention. The transmitter 301 mechanically and electrically interfaces with the electrical connector 103 of a conventional camera 101. A Receiver 303, as shown in FIG. 4, is provided in accordance with the present invention in order to mechanically and electrically interface with the electrical connector 105 of a conventional remote light source 102, such as a strobe. The transmitter and receiver 301, 303 are preferably coupled together by an optical waveguide 305, such as a plastic optical fiber.

In accordance with the preferred embodiment of the present invention, the optical waveguide 305 houses only one optical conductor. However, in an alternative embodiment, the fiber optic cable 305 may include a plurality of optical conductors, each intended to transmit a different signal or set of signals between the camera 101 and remote light source 102.

Figure 5A:
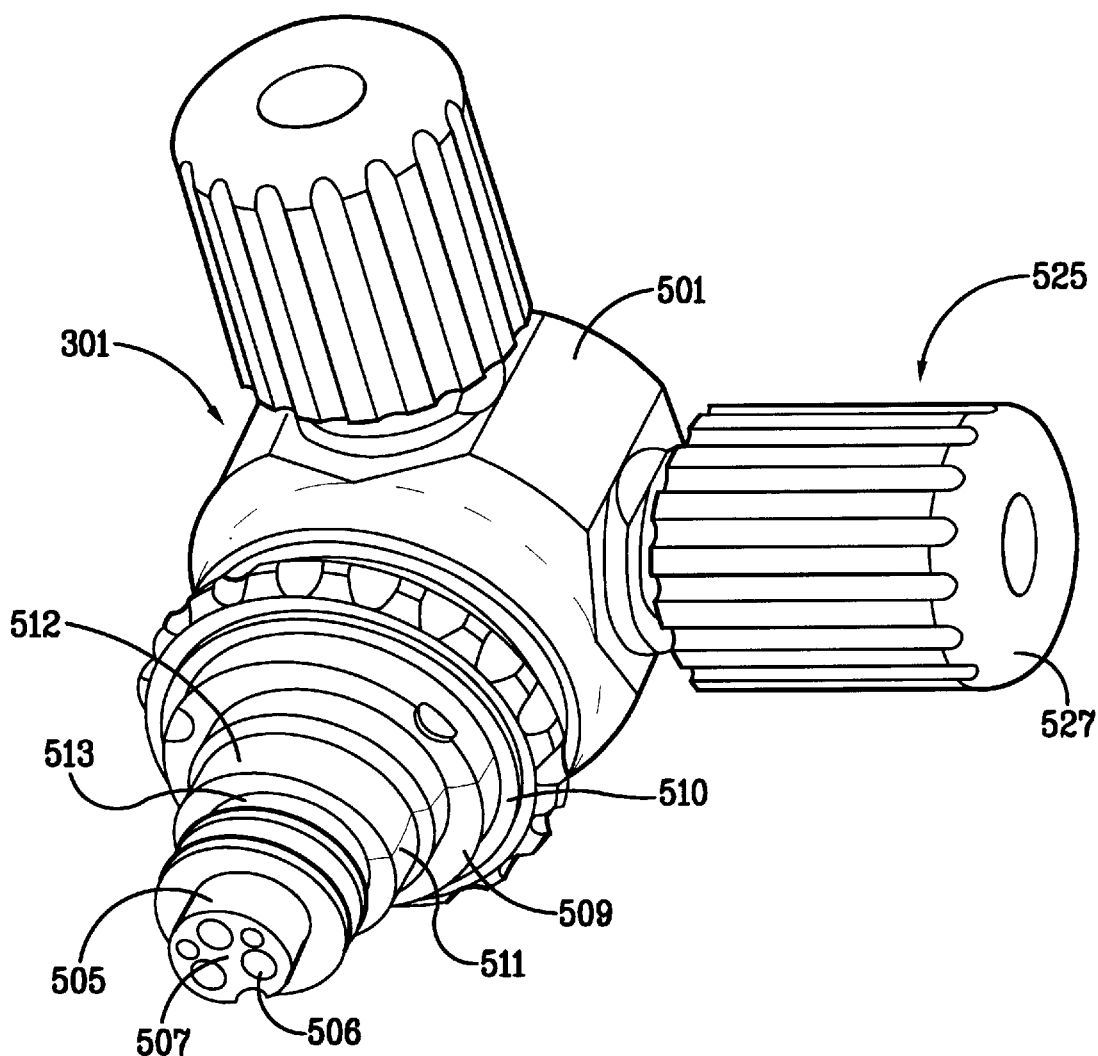
FIG. 5a is an isometric bottom view of the transmitter in accordance with one embodiment of the present invention.
Figure 5B:
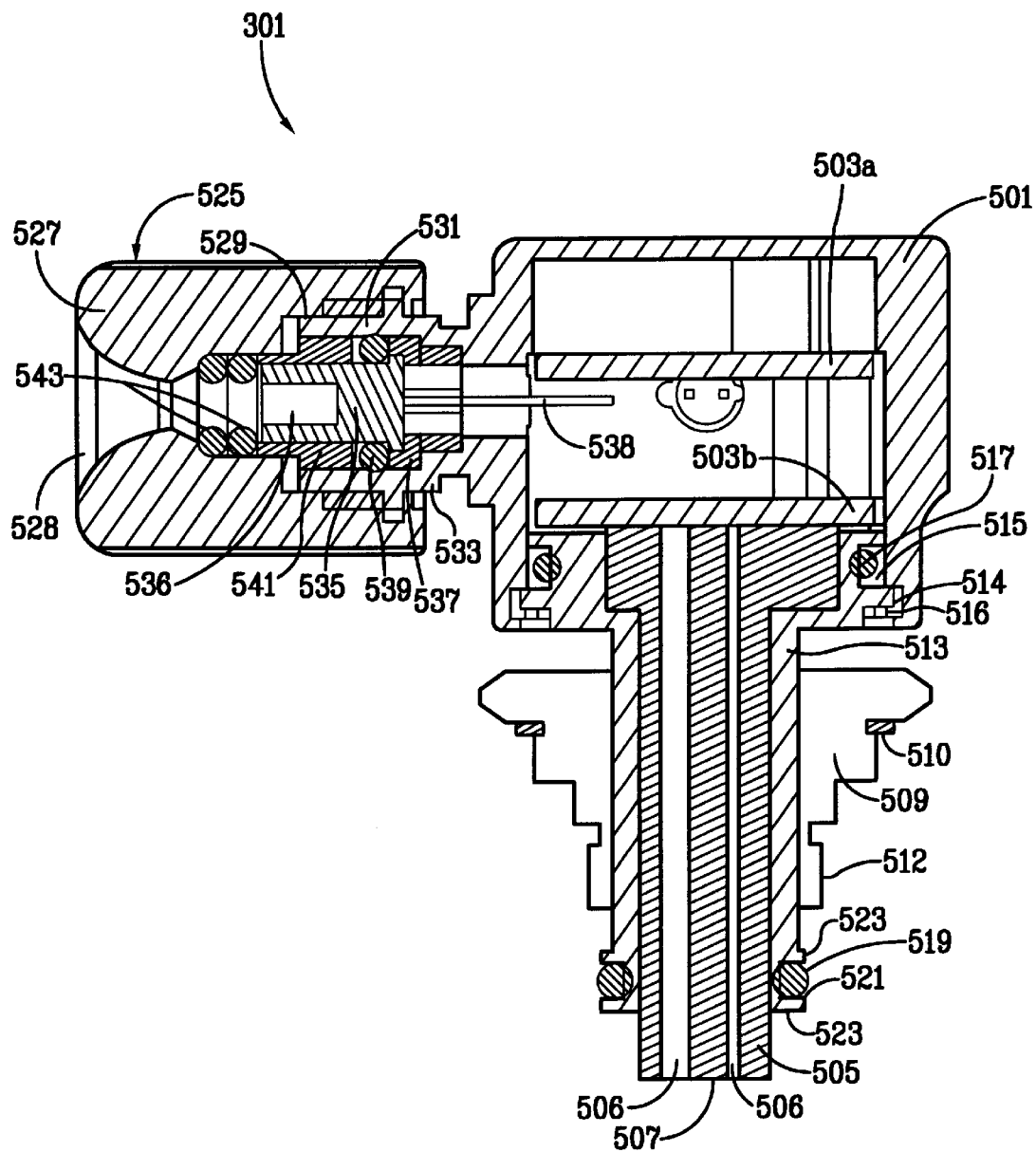
Figure 5C:
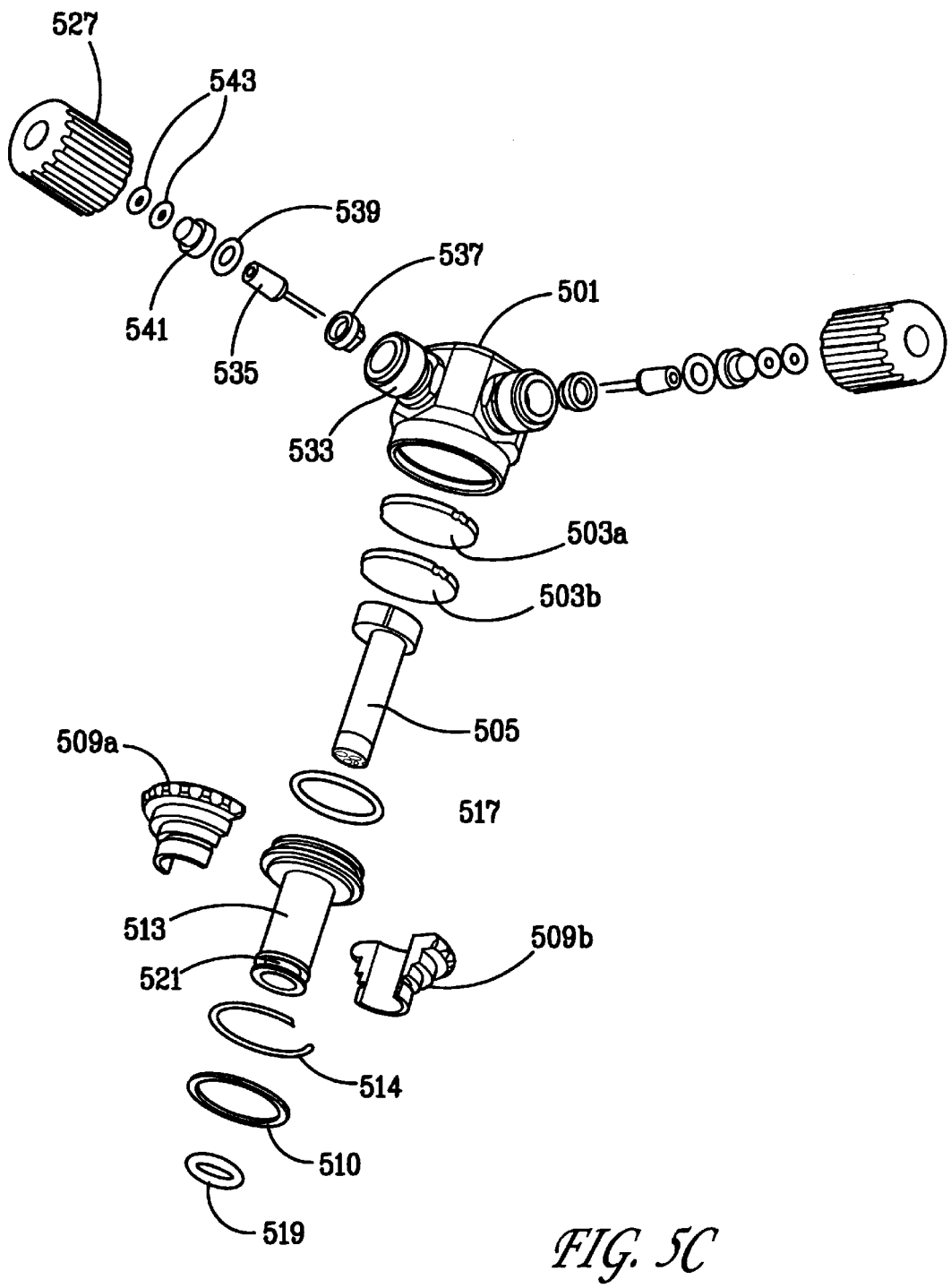

FIG. 5a is an isometric bottom view of one embodiment of the transmitter 301. FIG. 5b is a cross-sectional view of the transmitter 301. FIG. 5c is an exploded view of the component parts of the transmitter 301. The transmitter 301 has a transmitter cap 501 which preferably houses two transmitter circuit boards 503a, 503b. The two circuit boards 503a, 503b are electrically coupled together to provide the electronic circuits necessary to perform a conversion from an electrical input to an optical output. The circuit used in the preferred embodiment are described in detail below.

A transmitter pin block 505 is provided to guide and support electrical conductors (not shown) through recesses 506 from the circuit board 503b to the distal end 507 of the transmitter 301. The electrical conductors interface with electrical conductors in the electrical connector ofthe camera 101. For example, in accordance with one embodiment ofthe present invention, three of the conductors are formed as sockets to accept pins of the electrical connector on the camera 101. Two additional conductors are formed as contact pads which make contact with contact pads in the electrical connector on the camera 101.

A transmitter connector retaining ring 509 is formed in two pieces which are retained together by a snap ring 510. The transmitter connector retaining ring 509 is split down the center along line 511, as shown in FIG. 5a. The retaining ring 509 is threaded (not shown) on a portion 512 of the exterior to mate with threads on the interior of the connector in the camera 101. A transmitter base 513 is provided having an inner shaft which conforms generally to the outer contour of the transmitter pin block 505. The base 513 is retained within the transmitter cap by a transmitter cap/base snap ring 514 which fits within a recess 516 in the cap 501. The exterior of the base 513 conforms to the interior of the transmitter connector retaining ring 509 to allow the connector retaining ring 509 to freely slide up and down the exterior of the base 513. The transmitter base 513 preferably has a recess 515 in which a transmitter cap/base sealing ring 517 is located. The transmitter cap/base sealing ring 517 ensures that no moisture enters the transmitter cap 501 through the seam between the cap 501 and the base 513.

A transmitter connector sealing ring 519 resides within a recess 521 between two extrusions 523 in the exterior of the base 513 near the distal end 507. The upper extrusion serves as a stop for the motion of the retaining ring 509, ensuring that the retaining ring 509 remains mounted on the base 513. Each of the sealing rings 517, 519 are preferably fabricated from a relatively resilient polymer, such as silicon rubber. The transmitter connector sealing ring 519 provides a hermetic seal between the base 513 and the interior of the connector housing in the camera.

One or more optical ports 525 are provided in the transmitter 301. However, only one such port 525 is described herein for brevity. A fiber optic retaining ring 527 is provided having an opening 528 for receiving an optical waveguide, and a threaded interior 529 for engaging a threaded exterior 531 of a protrusion 533 of the cap 501. An LED (light emitting diode) 535, such as part #SFH750 from Siemens, having a recess 536 for receiving a fiber optic conductor is seated on an LED mounting ring 537. The LED 535 has an electrical conductor 538 which extends from the proximal end thereof to make electrical contact with circuitry on the circuit board 503a. The mounting ring 537 fits snugly within the protrusion 533 of the cap 501. An LED sealing ring 539 provides a hermetic seal between the LED 535 and the cap 501. An LED retaining ring 541 retains the LED 535 within the cap 501. Two fiber optic grip rings 543 reside within a conical interior portion 545 of the fiber optic retaining ring 527. As the fiber optic retaining ring is rotated, the threads of the retaining ring, in concert with the threads of the protrusion 533 cause the conical interior 545 of the retaining ring 527 to reduce the inner diameter of the grip rings 543. Therefore, when the fiber optic cable 305 (see FIG. 4) is inserted into the opening 528 in the retaining ring 527 and through the grip rings 543, the grip rings will retain the fiber optic cable upon rotating the retaining ring 527 in the direction which compresses the grip rings 543. Likewise, the fiber optic cable 305 can be released by rotating the retaining ring 527 in the opposite direction.

Figure 6A:
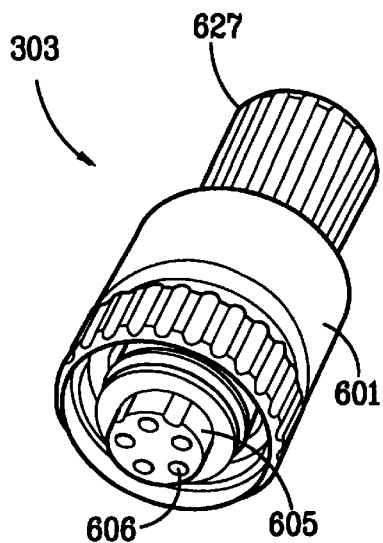
FIG. 6a is an isometric bottom view of a receiver in accordance with one embodiment of the present invention.
Figure 6B:
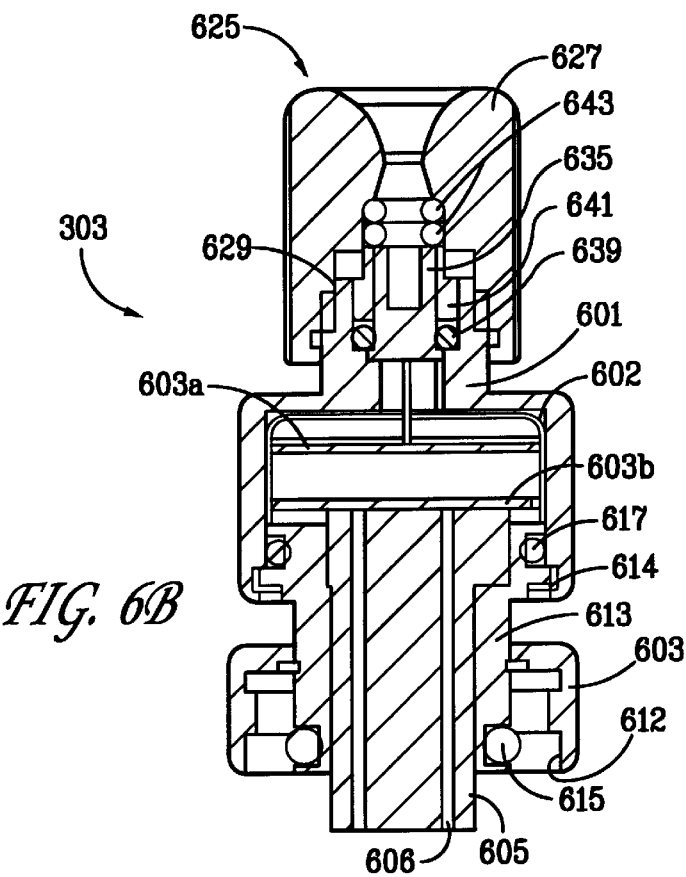

FIG. 6a is an isometric bottom view of a receiver 303 in accordance with one embodiment of the present invention. FIG. 6b is a cross-sectional view of the receiver 303 of FIG. 6a. The receiver includes a receiver cap 601 in which is housed two circuit boards 603a, 603b. A receiver connector block 605 has recesses 606 that are loaded with sockets for mating with the pins of the connector 105 of the remote light source 102. A receiver base 613 retains the connector block 605 in place within the cap 601. A receiver cap/base snap ring 614 retains the base 613 within the cap 601. A receiver cap/base sealing ring 617 ensures that no moisture enters the cap 601 through the seam between the cap 601 and the base 613. A portion of the interior of the cap 601 is preferably lined with a conductive material to form an electromagnetic interference (EMI) shield 602. The EMI shield 602 ensures that EMI that is radiated by the remote light source when the remote light source is triggered does not adversely impact the operation of the receiver 303. The EMI shield 602 is preferably soldered at multiple points to ground pads (not shown) around the periphery of circuit board 603b. The underside of circuit board 603b is formed as a ground plane having a single electrical connection to the electrical ground of the receiver circuit. The EMI shield 602 in conjunction with the multiple solder points and the ground plane of circuit board 603b form a "Faraday cage" enclosure which shields components and traces on the receiver circuit boards 603a and 603b from electromagnetic noise.

A receiver connector retaining ring 609 is threaded (not shown) on a portion 612 of its interior allowing the retaining ring 609 to mate with external threads (not shown) of a connector 105 on a remote light source 102. A receiver base/connector snap ring retains the receiver connector retaining ring 609 to the base 613. A receiver connector sealing ring 619 is disposed within a recess in the base 613. The receiver connector sealing ring 619 ensures a hermetic seal between the base and the connector 105 on the remote light source 102 when the receiver 301 is coupled to the remote light source 102.

Similar to the transmitter cap 501, the receiver cap 601 may have one or more optical ports 625. However, in the preferred embodiment, only one optical port is provided on the receiver 303. The optical port 625 of the receiver 303 is essentially identical to the optical port 525 of the transmitter 301, with the exception of the use of a photo-detector 635, such as part #SFH250 from Siemens, in place of the LED 535 of the transmitter 301. The photodetector 635 is seated directly in the cap 601 (as opposed to being seated in a mounting ring, as is the case in the transmitter 301). A photo-detector sealing ring 639 ensures that no moisture will enter the cap 601 through the seam between the photo-detector 635 and the cap 601. A photo-detector retaining ring 641 retains the photo-detector within the cap 601. Two optical waveguide grip rings 643 secure an optical waveguide in position with respect to the photo-detector 635. An optical waveguide retaining ring 627 having a conical interior cavity 645 and a threaded interior portion 629 cause the inside diameter of the grip rings 643 to contract when the retaining ring 627 is rotated in a first direction, thus capturing the optical waveguide 305. Rotating the retaining ring 627 in the opposite direction allows the inside diameter of the grip rings to return to original size and thus release the optical waveguide 305.

Figure 7:
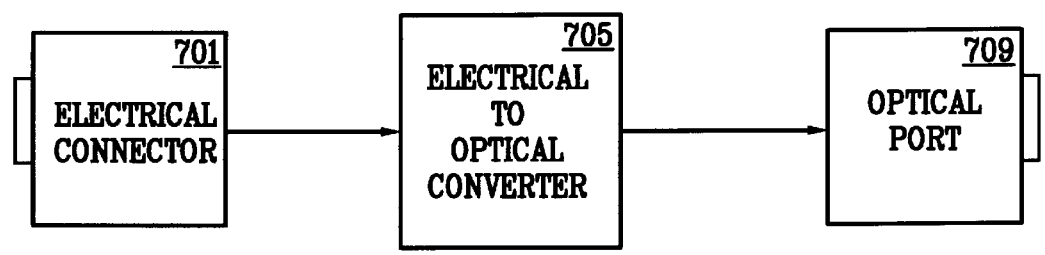
FIG. 7 is a simplified block diagram of the transmitter in accordance with one embodiment of the present invention.

FIG. 7 is a simplified block diagram of the transmitter 301 in accordance with one embodiment of the present invention. The transmitter 301 includes an electrical connector 701, an electrical-to-optical converter 705, and an optical port 709. The electrical connector 701 is configured to be adapted to the electrical connector 103 of a conventional camera 101. Since there is no one standard for such electrical connectors, the transmitter 301 is designed to interconnect with one particular style electrical connector, such as the connector used by Nikon in all of their cameras. Different transmitters and receivers can be manufactured which are designed to interconnect with the connector styles used by manufacturers who use a different electrical or mechanical interface. However, in the preferred embodiment of the present invention, the electrical connector of the transmitter is essentially as described with regard to FIG. 5a–5c.

The electrical-to-optical converter 705 receives electrical signals output from the camera 101 through the electrical connector of the camera 103 and the electrical connector of the transmitter 701. The converter 705 converts the received signal from an electrical signal to an optical signal by causing an optical transmitter to illuminate when the electrical signal is in a first logical state, and to cease illuminating when the electrical signal is in a second logical state. In the preferred embodiment of the present invention, the electrical-to-optical converter 705 is an LED. The optical port through which the optical signal is transmitted is preferably configured as described with regard to the optical ports 525 of FIG. 5a–5c.

Transmitter Circuitry

The transmitter circuitry is distributed over the two transmitter circuit boards 503a, 503b. In accordance with the preferred embodiment of the present invention, the first circuit board 503a includes all of the active circuitry. The second circuit board 503b includes the connections to the connector used to interface the transmitter 301 to the camera. Each circuit board also includes one three-volt battery, such as part number BR1225-1HC manufactured and distributed by Panasonic. The batteries are each intended to last the life of the transmitter. However, in an alternative embodiment, the batteries may be replaceable.

Figure 8:
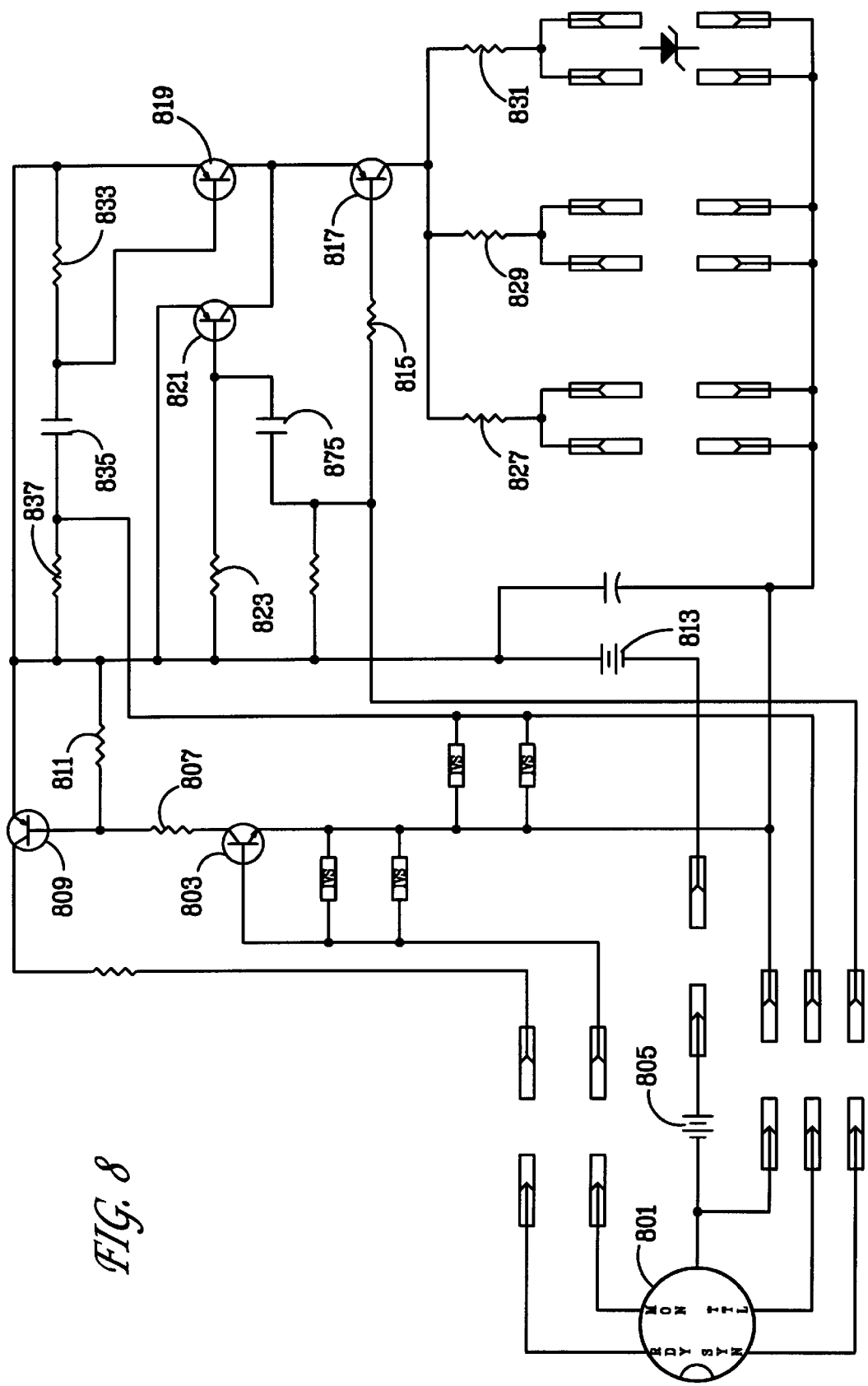
FIG. 8 is an electrical schematic of the circuitry provided within the transmitter shown in FIG. 7.

FIG. 8 is an electrical schematic of the circuitry provided within the transmitter 301. Five electrical connections are established between the circuit board 503b and the camera through a connector 801. The first connection is to a C-MONITOR signal within the camera 101. The C-MONITOR signal is routed through the board 503a to the base of a PNP transistor 803 on the board 503b. When the C-MONITOR signal is asserted (pulled low), the transistor 803 conducts. The emitter of the transistor 803 is coupled to the negative terminal of a 3 volt battery 805 through the connector that couples the two transmitter circuit boards 503a, 503b. The collector ofthe transistor 803 is coupled to the first terminal of a resistor 807. The second terminal of the resistor 807 is coupled to the base of a transistor 809 and to the first terminal of a resistor 811. The second terminal of the resistor 811 is coupled to the positive terminal of the second battery 813. The negative terminal of the battery 813 is coupled through the connector between the two circuit boards 503a, 503b to the positive terminal of the other battery 805. Therefore, when the transistor 803 is not conducting, the base ofthe transistor 809 is pulled high. Thus, the transistor 809 does not conduct without the C-MONITOR signal being asserted to a high voltage level to start transistor 803 conducting. The collector of transistor 809 is coupled to the C-READY signal input to the camera. The emitter of the transistor 809 is coupled to the positive terminal of the battery 813. Therefore, when the C-MONITOR signal is asserted, the transistor 803 will conduct, causing the transistor 809 to conduct, and thus causing a high signal to be coupled to the C-READY signal input to the camera. In accordance with the preferred embodiment of the present invention, transient voltage suppressors are provided at the terminals of the connector 801 and the negative terminal of the battery 805.

A C-SYNC signal from the camera is coupled through the connector 801 to the first terminal of a resistor 815. The second terminal of the resistor 815 is coupled to the base of a PNP transistor 817. Accordingly, when the C-SYNC signal is asserted (pulled low), the transistor 817 will conduct. The emitter of the transistor 817 is coupled to the collectors of two other PNP transistors 819, 821. The base of the transistor 821 is coupled to a pull-up resistor 823 that maintains the transistor 821 inthe non-conductive state. However, a first terminal of a capacitor 825 is also coupled to the base of the transistor 821. The second terminal ofthe capacitor 825 is coupled to the C-SYNC signal. Therefore, when the C-SYNC signal is asserted (pulled low), the transistor 817 will conduct, as will the transistor 821. However, the transistor 821 will only conduct for a short time (i.e., until the capacitor 825 charges). The emitter of the transistor 821 is coupled to the positive terminal of the battery 813. The collector of the transistor 817 is coupled to the first terminal of three resistors 827, 829, 831. The second terminal of each of these three resistors 827, 829, 831 may be coupled to the cathode of an LED. One, two, or three LEDs may be accommodated in this fashion. The anode of each LED is coupled to the negative terminal of the battery 805. Accordingly, when the C-SYNC signal is asserted, a light pulse is generated by each LED.

As can be seen in FIG. 8, the transistor 819 forms a parallel path to supply current to the emitter of the transistor 817. The base of the transistor 819 is coupled to a pull-up resistor 833 and to the first terminal of a capacitor 835. The second terminal of the capacitor 835 is coupled through the connector 801 to a C-STOP signal output from the camera 101 and to a pull-up resistor 837. Therefore, the transistor 819 will conduct momentarily and if the C-SYNC signal remains asserted when the C-STOP signal is asserted, a STOP pulse will be generated by the LEDs.

Receiver Circuitry

Figure 9:
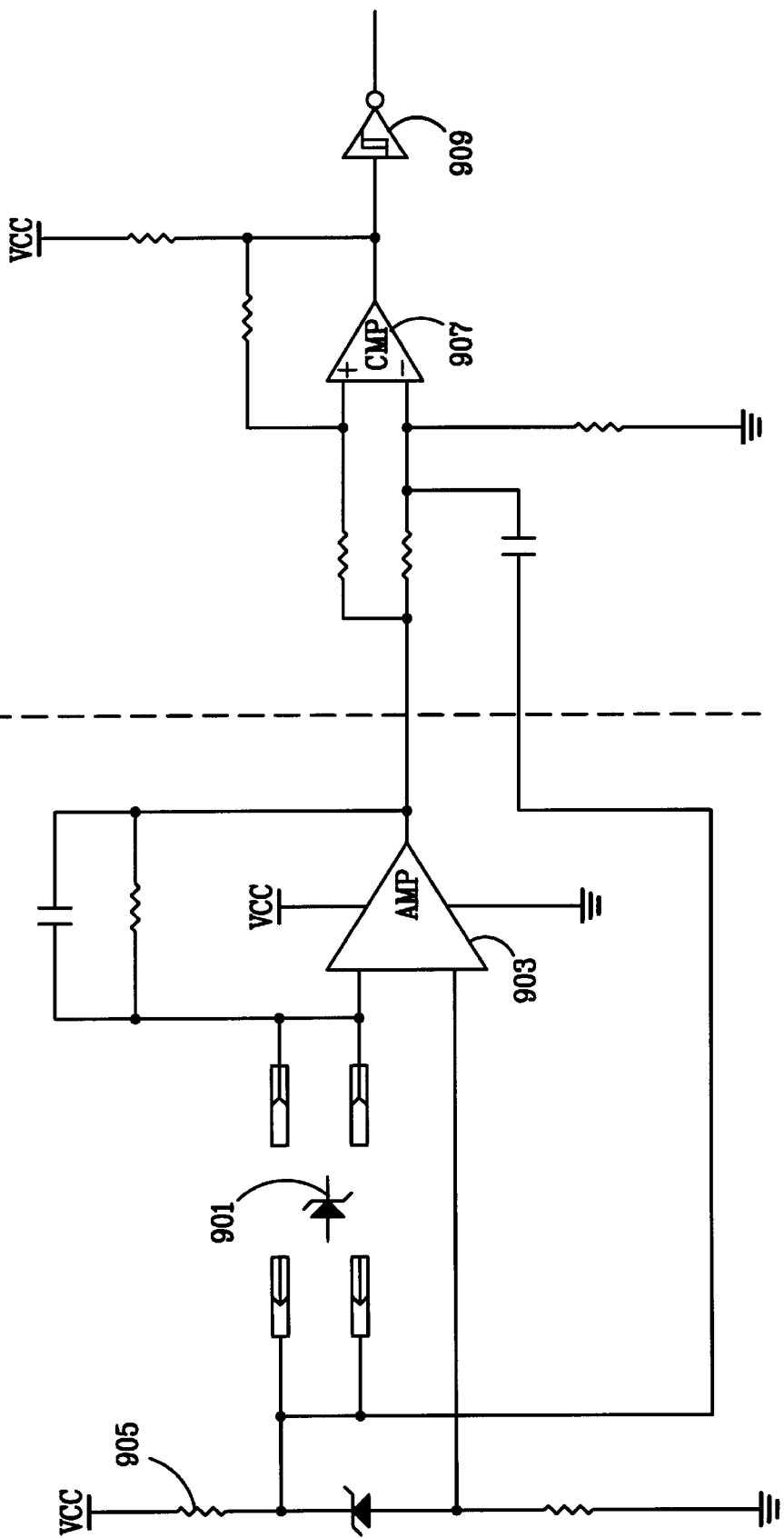
FIGS. 9–11 are electrical schematics of the receiver circuitry which resides on the two receiver circuit boards shown in FIG. 6.
Figure 10:
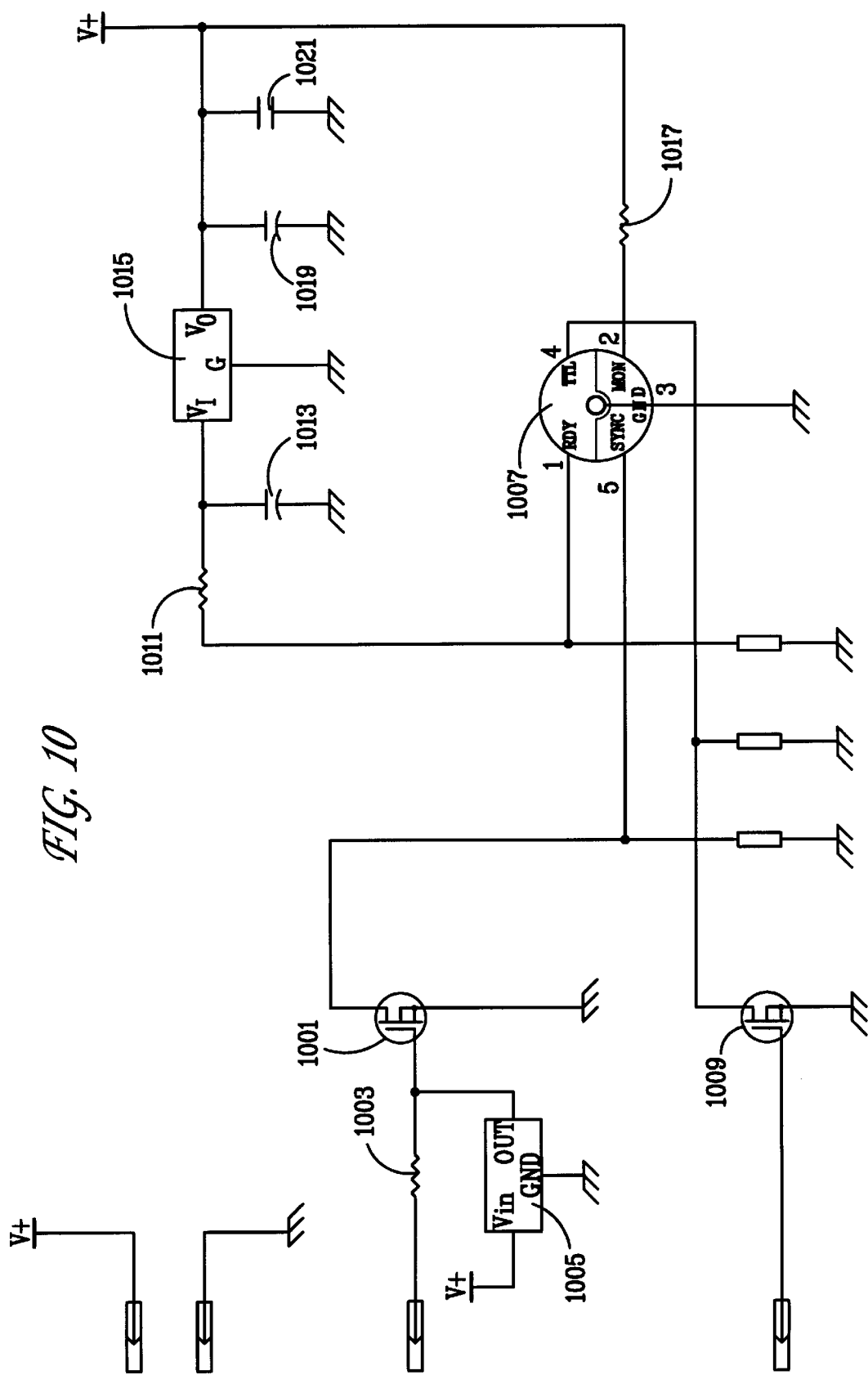
Figure 11:
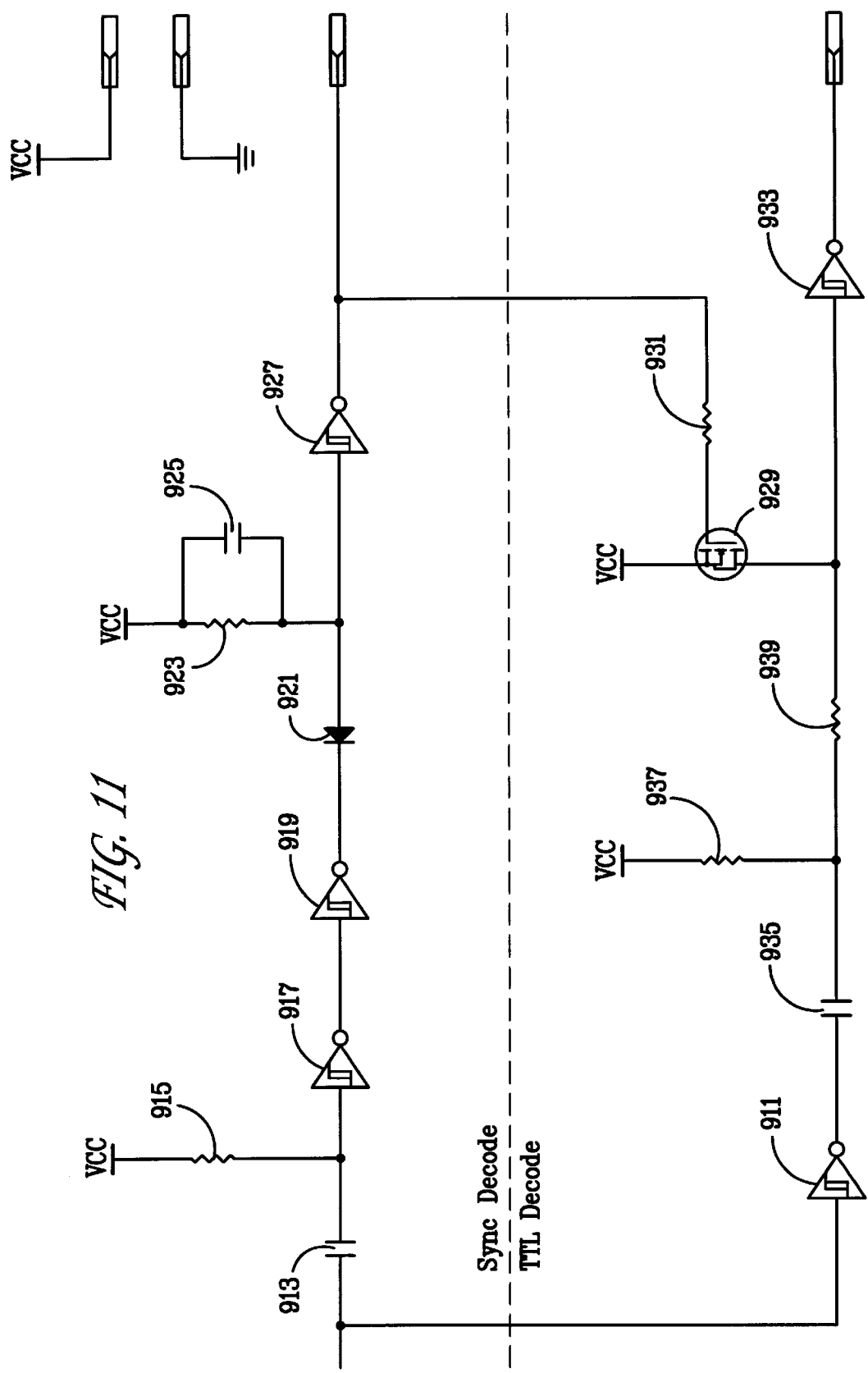

FIGS. 9–11 are electrical schematics of the receiver circuitry which resides on the two receiver circuit boards 603a, 603b. The circuit board 603a comprises two photo-detectors 901 coupled between the non-inverting input to an operational amplifier 903 and a first terminal of a resistor 905. The amplifier 903 provides an output that is indicative of the amplitude of the optical signal received by the photo-detectors 901. A digitizing circuit comprising a comparator 907 and a schmitt triggered buffer 909 provide a digital output corresponding to the logic state of the optical signal received by the photo-detectors 901.

The optical signal is coupled from the buffer 909 to a schmitt triggered buffer 911 and a first terminal of a capacitor 913. The second terminal of the capacitor 913 is coupled to a pull-up resistor 915 and to the input of a schmitt triggered buffer 917. The output from the schmitt triggered buffer 917 is coupled to the input to yet another schmitt triggered buffer 919. The output from the buffer 919 is coupled to the cathode of a diode 921. The anode ofthe diode 921 is coupled to a pull-up resistor 923 which is in parallel with a capacitor 925, and to the input to another schmitt triggered buffer 927. When the signal that is coupled from the buffer 909 to the capacitor 913 changes state from a high to a low voltage level, the input to the buffer 917 will be pulled low for a period of time (i.e., a negative going pulse will be created at the input to the buffer 917). The pulse that is thus created propagates to the output of the buffer 919 and is shaped into a digital pulse. When the output of the buffer 919 changes state from a high to a low voltage level, the diode 921 will conduct bringing the voltage level at the input to the buffer 927 to a low voltage level. Accordingly, a positive going output pulse will be generated at the output of the buffer 927 in response to a negative transition on the output of the buffer 909.

The output from the buffer 927 is coupled to a FET driver 1001 through a resistor 1003. (See FIG. 10). An under-voltage lockout circuit 1005 is provided at the input to the driver 1003 to ensure that if the voltage level supplied to the receiver drops below a predetermined level, the gate to the FET drive 1001 will be held in a known state. The source of the FET driver 1001 is coupled through the connector 1007 to the RLS-SYNC signal input to the remote light source. The drain of the FET 1001 is coupled to ground. Therefore, when the FET driver 1001 conducts, the RLS-SYNC signal at the remote light source is asserted.

The output of the buffer 927 is also coupled to the gate of an FET (field effect transistor) 929 through a resistor 931. The source of the FET 929 is coupled to a high voltage source, while the drain of the FET 929 is coupled to the input to a buffer 933. Therefore, when the output from the buffer 927 is high, the FET will conduct, causing the buffer 933 to output a low voltage level. When the signal coupled to the input of the buffers 911 and 917 transitions to a high voltage level, the output of the buffer 927 will be unaffected. However, the output of the buffer 911 will transition to a low voltage level. The output from the buffer 911 is coupled through a capacitor 935 a pull-up resistor 937 and to the first terminal of a series resistor 939. The voltage at the first terminal of the resistor 939 will transition to a low voltage level. If the FET 929 is not conducting, then the input to the buffer 933 will transition to a low voltage level. Accordingly, the output from the buffer 933 will transition to a high voltage level. The output from the buffer 933 is coupled to an FET driver 1009, the source of which is coupled through the connector 1007 to the RLS-STOP signal input of the remote light source. The drain of the FET driver 1009 is coupled to ground. Therefore, when the FET driver 1009 conducts, the RLS-STOP signal is asserted.

One of the connections of the connector 1007 is coupled to the RLS-READY signal output from the remote light source and to a first terminal of a resistor 1011 on the circuit board 603b. The second terminal of the resistor 1011 is coupled to a capacitor 1013 and to the input terminal to a voltage regulator 1015. The capacitor 1013 and resistor 1011 form a low-pass filter which isolates the voltage regulator 1015 from high-speed voltage swings in the RLS-READY signal. The voltage output terminal from the regulator 1015 is coupled to the first terminal of a resistor 1017. Two capacitors 1019, 1021 are coupled to the output voltage terminal of the voltage regulator 1015 to stabilize the regulator 1015. The second terminal of the resistor 1017 is coupled through the connector 1007 to the RLS-MONITOR signal input of the remote light source 103. When the RLS-READY signal is asserted by the remote light source 103, the RLS-MONITOR signal input to the remote light source 103 will also be asserted. A transient voltage suppressor is preferably coupled to the RLS-SYNC, RLS-READY, and RLS-STOP signal terminals of the connector 1007.

It should be understood that while the above transmitter and receiver circuitry is described as residing on circuit boards 303a, 303b, 603a, 603b, in one embodiment of the present invention, the transmitter circuit resides within the camera 101, and the receiver circuitry resides within the remote light source 103.

Slave Operation

In accordance with one embodiment of the present invention, a remote lighting system is provided in which a receiver is coupled to each of a plurality of remote light sources. However, a "Master" receiver associated with only one remote light source (i.e., a "Master" remote light source) is coupled, and will be directly triggered by, a transmitter. The transmitter is coupled to a camera and transmits the SYNC and STOP signals from the camera to the Master receiver. The Master receiver indicates when the Master remote light source is to start and stop emitting light. The optical ports of the other remote light source (i.e., the "Slave" remote light sources) are coupled to optical conductors, the open ends of which are aimed at the object to be photographed (or directly at the Master remote light source). When the camera causes the transmitter to generate a SYNC signal, and the SYNC signal is received in the Master receiver, the Master remote light source will be triggered. The light emitted by the Master remote light source will enter the open end of the optical conductors that are coupled to each of the Slave receivers. When the light that traverses the optical conductor is detected by the Slave receivers, each Slave receiver will trigger the Slave remote light source to which that receiver is coupled. By positioning the open ends of the optical conductors in a bundle so that they are illuminated (either directly or indirectly) by the Master remote light source, the optical conductors will transmit sufficient light to each of the slave receivers to allow each such Slave receiver to reliably determine when the Master receiver has been triggered.

Multiplexed SYNC and STOP Signals

Figure 12:
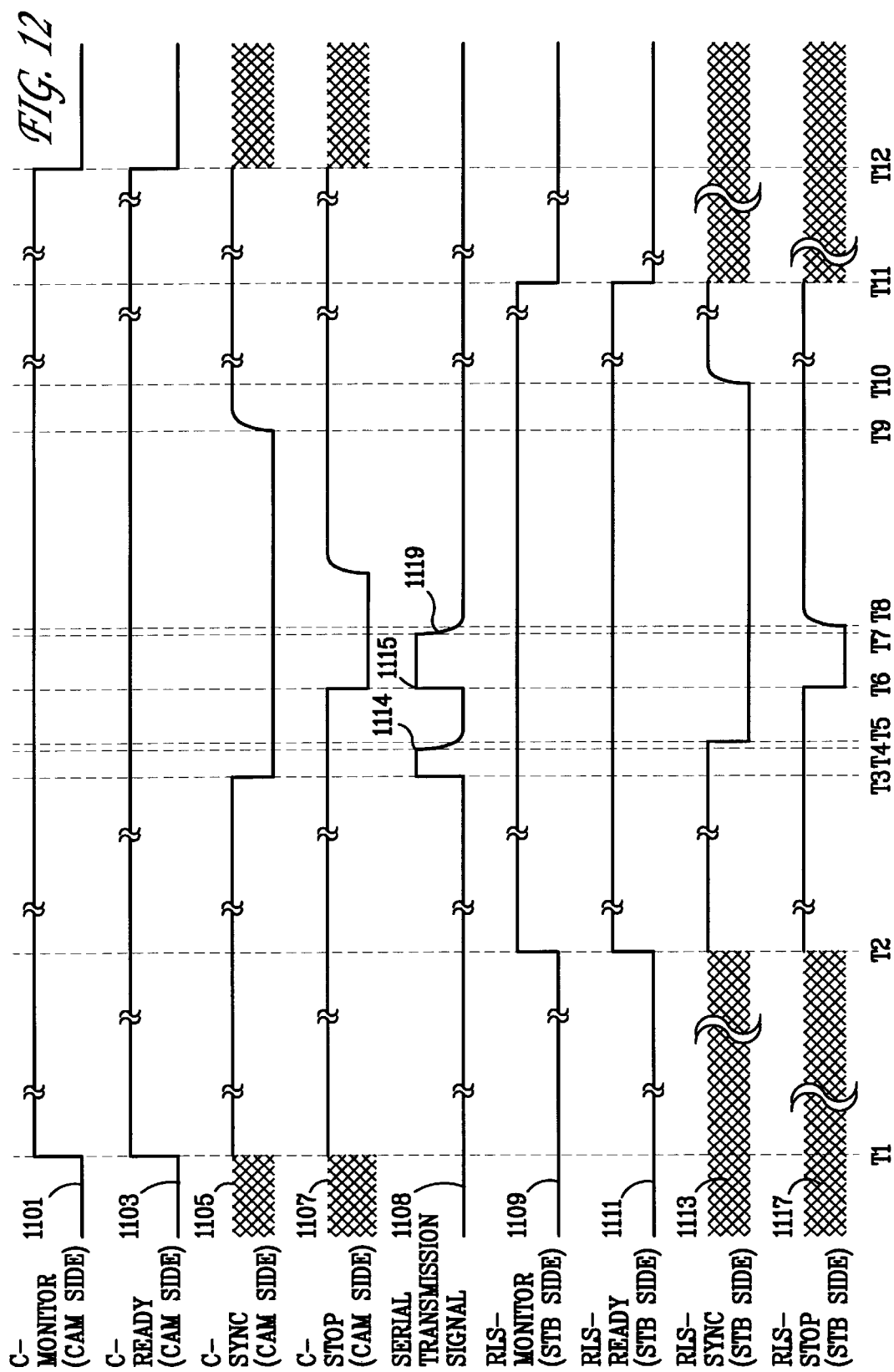
FIG. 12 is a timing diagram that aids in understanding the manner in which such indications are multiplexed in accordance with one embodiment of the present invention in which the indications are SYNC and STOP signals.

In accordance with one embodiment of the present invention, indications that a user intends to activate a remote light source and modulate the remote light source, such the SYNC and STOP signals of a TTL exposure control system, are multiplexed so that both the signals are transmitted from the camera to the remote light source on the same conductor (either one electrical wire or one optical waveguide). FIG. 12 is a timing diagram that aids in understanding the manner in which such indications are multiplexed in accordance with one embodiment of the present invention in which the indications are SYNC and STOP signals.

In accordance with the conventional manner in which SYNC and STOP signals are generated, the camera 101 typically activates a C-MONITOR signal 1101 to indicate to the remote light source 102 that the user is about to activate the shutter. In response, the remote light source 102 typically activates an RLS-READY signal 1103. Upon receipt of the C-READY signal at the camera 101, the C-SYNC signal 1105 and C-STOP signal 1107 are pulled-up from a high impedance state to a high logic state at a time T1. That is, in order to save power, the C-SYNC and C-STOP signals 1105, 1107 may be maintained in a high impedance (or "tri-state") condition until the C-READY signal 1103 is received. Once the C-READY signal 1103 is received, the C-SYNC and C-STOP signals 1105, 1107 are coupled to a high voltage source through a relatively high resistance.

In accordance with one embodiment of the present invention, the C-MONITOR signal 1101 is looped back within the transmitter 301 back into the C-READY signal 1103, so that the C-READY signal 1103 is received by the camera 101 as soon as the C-MONITOR signal 1101 is asserted. Therefore, the C-MONITOR signal 1101 at the camera side of the system may not be in the same logical state as the RLS-MONITOR signal 1109 at the remote light source side of the system, as illustrated in FIG. 12 between time T1 and T2. If the C-MONITOR signal 1101 is looped back to the C-READY signal 1103, typically, the RLS-READY signal 1111 will be looped back into the RLS-MONITOR signal 1109 at the remote light source side of the system. Therefore, at a time T2 when the remote light source 102 is fully charged and ready to be triggered, both the RLS-MONITOR signal 1109 and the RLS-READY signal 1111 at the remote light source side of the system will be asserted. Loop-back of the C-MONITOR signal 1101 and the RLS-READY signal 1111 is used to simplify the circuitry within the camera and remote light source.

It should be noted that the MONITOR and READY signals 1101, 1103, 1109, 1111 are asserted in the high logic state. However, the SYNC and STOP signals 1105, 1107, 1113, 1117 are asserted in the low logic state.

In accordance with the protocol shown in FIG. 12, at a time T3 when the shutter is activated by a user input provided through the camera 101 (such as the user pressing the shutter button), the camera 101 asserts the C-SYNC signal 1105 by shorting the C-SYNC signal line to the GROUND wire. Typically, this is accomplished by a switch that is mechanically coupled to the shutter of the camera 101. The C-SYNC signal 1105 changes logic state relatively quickly in response to the low impedance path created between the SYNC wire and the GROUND wire when the switch is closed.

In response to the user input provided through the camera (and the resulting C-SYNC signal 1105 being activated), an indication is generated on the serial transmission line. In the embodiment of the present invention shown in FIG. 12, the indication takes the form of a serial transmission signal 1108 which is asserted (e.g., an optical transmitter is activated) at time T3. In an alternative embodiment of the present invention, the serial transmission signal may be asserted in direct response to the user activating the shutter. In the case in which the serial transmission signal is an optical signal, optical transmitters can typically be asserted relatively rapidly, making the rise time of the serial transmission signal 1108 relatively short. Therefore, the rising edge the serial transmission signal 1108 will be 120 transmitted from the camera to the remote light source 102 with a relatively short delay.

The serial transmission signal 1108 preferably remains asserted for the minimum amount of time required for an receiver within the remote light source 102 to detect the change in the logical state ofthe serial transmission signal 1108 and is then turned off (i.e,. the serial transmission signal 1108 is de-asserted) at time T4. Turning off the serial transmission signal 1108 typically takes longer than turning on the serial transmission signal 1108. Therefore, the serial transmission signal 1108 will not reach the low logic state until a time T5. If the remote light source is ready, then in response to the trailing edge 1114 of the SYNC pulse being received at the remote light source 102 at the time T5, a light source trigger signal, such as the RLS-SYNC signal 1113, is asserted (e.g., preferably transitions to the low logic state) at the remote light source 102. The RLS-SYNC signal 1113 triggers the remote light source to emit light. In an alternative embodiment of the present invention, the trailing edge 1114 of the serial transmission signal 1108 directly triggers the remote light source.

In accordance with one embodiment ofthe present invention in which a TTL exposure control system is used, a light sensor, such as a photo-detector, is aimed at the film plane to determine when the required amount of light has been received. At a time T6 when the photo-detector determines that the desired amount of light has been received, the C-STOP signal 1107 is asserted by the camera. In response, the transmitter is again turned on to generate a second indication, such as the rising edge 1115 of a second pulse (i.e., the serial transmission signal 1108 is asserted and transmitted to the remote light source 102 over the conductor 103). In an alternative embodiment, the transmitter is turned on in direct response to the photo-detector. Once again the rise time of the serial transmission signal 1108 is relatively short resulting in a relatively short delay between the time the rising edge 1115 ofthe serial transmission signal 1108 is generated and the time the rising edge is received and detected at the remote light source 102.

In response to receipt of the rising edge 1115 at the remote light source 102, a light source control signal, such as the RLS-STOP signal 1117, is asserted at a time T6. In response to the RLS-STOP signal 1117, the remote light source ceases emitting light at the time T6. Alternatively, the remote light source ceases emitting light directly in response to the receipt of the rising edge 1115 of the serial transmission signal 1108. The second pulse lasts for a period of time that is sufficient to ensure that the remote light source 102 will detect the rising edge of the pulse. In the preferred embodiment, the second pulse lasts for approximately 20 microseconds. At a time T7 the pulse begins to fall. At a time T8, the remote light source 102 detects the falling edge 1119 of the second pulse and releases the RLS-STOP signal 1117 allowing the RLS-STOP signal 1117 to be pulled-up.

At a time T9, which occurs a first predetermined amount of time after the C-SYNC signal 1105 at the camera side ofthe system has been asserted, the signal 1105 will be released to return to the de-asserted logic state. Likewise, a second predetermined time after the signal 1113 has been asserted, the signal 1113 will be de-asserted. The de-assertion of each SYNC signal 1105, 1113 may be completely asynchronous with respect to one another. In accordance with the embodiment shown in FIG. 12, the C-SYNC signal 1105 is shown to rise at a time T9 before the signal 113 rises at a time T10.

In accordance with the embodiment of the present invention shown in FIG. 12, the RLS-READY signal 1111 will be de-asserted at a time T11. Since the RLS-READY signal 1111 is preferably looped back to the RLS-MONITOR signal 1109, the RLS-MONITOR signal 1109 is also de-asserted at time T11. In accordance with the embodiment shown in FIG. 12, the pull-up resistors that maintain the RLS-SYNC and RLS-STOP signals 1113, 1117 in the high logic state are disabled, placing the RLS-SYNC and RLS-STOP signals 1113, 1117 in a high impedance tri-state logic level.

Likewise, at a time T12, the C-MONITOR signal 1101 will be de-asserted. Since the C-MONITOR signal 1101 is preferably looped back to the C-READY signal 1103, the C-READY signal 1103 is also de-asserted at time T12. In accordance with the embodiment shown in FIG. 12, the pull-up resistors that maintain the C-SYNC and C-STOP signals 1105, 1107 in the high logic state are disabled, placing the C-SYNC and C-STOP signals 1105, 1107 in a high impedance tri-state logic level. It should be clear that the pull-up resistors on the SYNC and STOP signals on both sides of the system may remain actively coupled to the SYNC and STOP signals regardless of the logic state of the MONITOR and READY signals.

In an alternative embodiment of the present invention, the remote light source may be triggered by the serial transmission signal 1108 changing state from a high to a low logic level. However, when the serial transmission signal is an optical signal, the delay between the time that the serial transmission signal begins to fall at the camera side of the system and the time that the detector detects the serial transmission signal to have a low logic level at the remote light source side of the system will typically be greater than delay that exists between the time the serial transmission signal begins to rise and the time the serial transmission signal is detected as having a high logic level at the remote light source side of the system. Similarly, the remote light source may be stopped (i.e., light emission halted) in response to the serial transmission signal changing state from a high to a low logic level.

In yet another embodiment of the present invention, the first indication generated by the camera in response to the user providing an input through the camera may be a pulse of a predetenmined duration. At the trailing edge of the pulse, the remote light source triggers.

The second indication (i.e., the indication that sufficient light has been received at the film plane) may be either the leading edge of a pulse or the trailing edge of a pulse of particular duration. It should be understood that the pulse must be relatively short to prevent an excessive amount of light from being received at the film plane.

Multiplexed Monitor, Ready, Sync, and Stop Signals

The embodiment of the present invention that is described above with regard to FIG. 12 does not provide for communication of the MONITOR and READY signals over the serial transmission signal 1108. FIG. 13 is a timing diagram of an embodiment of the present invention that does provide for communication of the MONITOR and READY signals on a serial transmission signal 1201. In accordance with the embodiment of the present invention shown in FIG. 13, a transceiver is provided at both the camera side of the system and at the remote light source side of the system. A single optical conductor or a pair of electrical conductors (one signal line and one return) for a serial transmission line between the two transceivers. In accordance with one embodiment of the present invention in which the serial transmission signal is an optical signal, each transceiver is a conventional light-emitting diode used in both light-emitting and photo-detecting modes. If the serial transmission signal is an electrical signal, then the transceiver may be a conventional bidirectional open-collector circuit. Such transceivers allow for only half-duplex operation. However, full-duplex transceivers may be used to implement the present invention.

In accordance with one embodiment of the present invention, a transition to a high logic state of the C-MONITOR signal at the camera side of the system is communicated from the camera to the remote light source on the serial transmission line as a "MONITOR HIGH" pulse having a first predetermined duration. In accordance with one embodiment, the MONITOR HIGH pulse has a duration of 100 μs +/−50 μs. Likewise, a transition to a high logic state of the RLS-READY signal at the remote light source side of the system is communicated from the remote light source to the camera on the serial transmission line as a "READY HIGH" pulse having a second predetermined duration. In accordance with one embodiment of the present invention, the first and second predetermined durations are the same. Accordingly, the READY HIGH pulse lasts for 100 μs +/−50 μs. A transition of the C-MONITOR signal to a low logic state at the camera side of the system is communicated from the camera to the remote light source on the serial transmission line as a "MONITOR LOW" pulse having a third predetermined duration. In accordance with one embodiment, the MONITOR LOW pulse has a duration of 500 μs +/−200 μs. Likewise, a transition of the RLS-READY signal to a high logic state at the remote light source side of the system is communicated from the remote light source to the camera on the serial transmission line as a "READY LOW" pulse having a fourth predetermined duration. In accordance with one embodiment of the present invention, the third and fourth predetermined durations are the same. Accordingly, the READY HIGH pulse lasts for 500 μs +/−200 μs. A SYNC signal is transmitted from the camera to the remote light source as a 3–10 μs is SYNC pulse followed by a 10 ms "blackout" period. Any signal transmitted by the camera during the blackout period will be detected by the remote light source as a STOP pulse.

In accordance with one embodiment of the present invention, when the user presses the shutter button partially down, the camera generates a C-MONITOR signal 1203 at a time T1. In response, a MONITOR HIGH pulse 1204 is transmitted over the serial transmission line to the remote light source. Upon detecting the trailing edge 1205 of the MONITOR HIGH pulse 1204, an RLS-MONITOR signal 1207 is asserted in the remote light source at a time T2. When the remote light source is ready to be triggered, the RLS-READY signal 1209 is asserted in the remote light source at a time T3. In response to the RLS-READY signal 1209 being asserted, a READY HIGH pulse 1210 is transmitted to the camera on the serial transmission line. In addition, pull-up resistors are coupled to an RLS-SYNC and to an RLS-STOP signal, pulling the signals up to a logic high level.

Upon detecting the trailing edge 1211 of the READY HIGH pulse 1210 at a time T4, a C-READY signal 1213 is asserted in the camera. In addition, pull-up resistors are coupled to a C-SYNC signal 1218 and to a C-STOP signal 1219, pulling the signals up to a logic high level. Upon the user activating the shutter, the C-SYNC signal 1219 within the camera is asserted (i.e., pulled to a logic low level) at a time T5. In response, a SYNC pulse 1215 is transmitted to the remote light source over the serial transmission line. Upon detecting the trailing edge ofthe SYNC pulse 1215, a RLS-SYNC signal 1217 is asserted at the remote light source. The RLS-SYNC signal 1217 triggers the remote light source to start emitting light. At a time T6 when a photo-detector within the camera determines that sufficient light has been received on the film plane, the camera will assert the C-STOP signal 1219. In response, a STOP pulse 1220 is transmitted over the serial transmission line to the remote light source. Upon detecting the leading edge 1221 of the STOP pulse 1220, a RLS-STOP signal 1223 is asserted and the remote light source ceases emitting light at the time T6. At a later time T7, when the remote light source is no longer be ready, the RLS-READY signal 1209 will be de-asserted. A READY LOW pulse 1225 is generated in response to the RLS-READY signal 1209 being de-asserted. Similarly, after a predetermined time, the C-MONITOR signal 1203 will be de-asserted. In response, a MONITOR LOW pulse 1227 is transmitted from the camera to the remote light source over the serial transmission line at a time T8.

As is the case with the embodiment described with respect to FIG. 12, the camera and remote light source may respond directly to the condition of the serial transmission signal 1201. That is, in one embodiment of the present invention, the C-MONITOR signal 1203, the C-READY signal 1213, the C-SYNC signal 1219, the RLS-MONITOR signal 1207, the RLS-READY signal 1209, the RLS-SYNC signal 1217, and the RLS-STOP signal 1223 are not required because the camera and remote light source directly generate appropriate pulses on the serial transmission signal and respond directly to the changes in the logic levels of the serial transmission signal. For example, detection of the trailing edge of the SYNC pulse 1215 causes the remote light source to start emitting light. Detection of the leading edge 1221 of the STOP pulse 1220 causes the remote light source to cease emitting light.

Summary

A number of embodiments of the present invention have been described. Nevertheless, it will be understood that various modifications may be made without departing from the spirit and scope of the invention. For example, even though particular circuitry has been described for implementing the present invention, it should be understood that any circuit that detects changes of logical state ofthe serial transmission signal can be used in the receiver. Furthermore, any circuit that can provide sufficient indications on the serial line to enable the light modulation signal to be distinguished from the light initiation signal can be used in the transmitter. Accordingly, it is to be understood that the invention is not to be limited by the specific illustrated embodiments, but only by the scope of the appended claims.

What is claimed is:

1. A multiplexing transducer, coupleable to a camera, for receiving STOP and SYNC signals from the camera and transmitting them to a remote light source on a single communication channel, the multiplexing transducer including:

(a) a first detector that receives a SYNC signal input to initiate light emission;
   (b) a second detector that receives a STOP signal input to modulate light emission in response to light received in the camera; and
   (c) an optical pulse generator, coupled to the first and second detector, that responds to detection of the SYNC signal by the first detector by generating a first optical pulse signal and to detection of the STOP signal by the second detector by generating a second optical pulse signal, the first and second optical pulse signals being transmitted along the single communication channel to the remote light source;

wherein communication between the camera and the remote light source over the single communication channel is exclusively unidirectional during the period between the first and second optical pulse signals, and wherein the single communication channel comprises an optical communication channel.

2. The multiplexing transducer of claim 1, wherein the pulse generator responds to the detection of a SYNC signal by asserting an output signal for a first predetermined amount of time, and the pulse generator responds to the detection of a STOP signal by asserting the output signal for a second predetermined amount of time.

3. The multplexing transducer of claim 1, wherein the pulse generator responds to the detection of a SYNC signal by asserting or de-asserting an output signal, and the pulse generator responds to the detection of a STOP signal by de-asserting or asserting the output signal.

4. The multiplexing transducer of claim 2, wherein the first and second predetermined amount of the are equal.

5. The mutiplexing transducer of claim 2 wherein the first and second predetermined amount of time are unequal.

6. The multiplexing transducer of claim 1, wherein the pulse generator responds to the detection of a light initiation signal by de-asserting an output signal, and the pulse generator responds to the detection of a light modulation signal by asserting the output signal.

7. The multiplexing transducer of claim 1, wherein the single communication channel comprises a fiber optic cable.

8. The multiplexing transducer of claim 1, wherein said multiplexing transducer is constructed integrally with said camera.

9. A demultiplexing transducer, coupleable to a remote light source, for receiving an optical signal over a single communication channel and responsively generating SYNC and STOP signals for controlling the remote light source, the demultiplexing transducer including:

(a) a state change detector for detecting a first state change of the optical signal representative of a light initiation request from a camera, and for detecting a second state change of the optical signal representative of a light modulation request from the camera in response to light received thereby;

(b) a SYNC signal generator, coupled to the state change detector for generating a SYNC signal responsive to detection of the first state change; and
   (c) a STOP signal generator coupled to the state change detector for generating a STOP signal responsive to detection of the second state change;

wherein communication from the camera to the remote light source over the single communication channel is exclusively unidirectional in the period between the first and second state changes, and the first and second state changes comprise a change from a first optical state to a second optical state.

10. The demultiplexing transducer of claim 9, wherein the first state change is a change from a de-asserted state to an asserted state, and the second state change is a next change from a de-asserted state to an asserted state.

11. The demultiplexing transducer of claim 9, wherein the first state change is a change from a de-asserted state to an asserted state, and the second state change is the next change from an asserted state to a de-asserted state.

12. The demultiplexing transducer of claim 9, wherein the first state change is change of state from an asserted state to a de-asserted state, and the second state change is the next change from a de-asserted state to an asserted state.

13. The demultiplexing transducer of claim 9, wherein the single communication channel comprises a fiber optic cable.

14. The demultiplexing transducer of claim 11, wherein said demultiplexing transducer is constructed integrally with said remote light source.

15. A method for transmitting a light modulation signal and a light initiation signal generated by a camera to a remote light source over a single optical communication channel, the method including the steps of:

(a) detecting the light initiation signal for initiating the emission of light from the remote light source and responsively generating a first optical pulse;
   (b) detecting a light modulation signal for modulating the emission of light in response to light received in the camera and responsively generating a second optical pulse; and
   (c) transmitting the first and second optical pulses to the remote light source over the single optical communication channel;

wherein communication between the camera and the remote light source over the single communication channel is exclusively unidirectional during the period between the first and second optical pulses.

16. The method of claim 15, wherein the single optical communication channel comprises a fiber optic cable.

17. The method of claim 15, wherein the step of generating a pulse in response to detection of a light initiation signal includes asserting an output signal for a first predetermined amount of time, and the step of generating a pulse in response to the detection of a light modulation signal includes asserting the output signal for a second predetermined amount of time.

18. The method of claim 15, wherein the step of generating a pulse in response to detection of a light initiation signal and light modulation signal includes asserting an output signal upon detection of the light initiation signal and de-asserting the output signal upon detection of the light modulation signal.

19. The method of claim 15, wherein the step of generating a pulse in response to detection of a light initiation signal and light modulation signal includes de-asserting an output signal upon detection of the light initiation signal and asserting the output signal upon detection of the light modulation signal.

20. A method for receiving light modulation signals and light initiation signals from a camera and providing them to a remote light source, the method including the steps of:

(a) detecting a first state change in an optical signal received over a single optical communication channel and determining that it is a SYNC signal for initiating light emission from a remote light source;

(b) detecting a second state change in the optical signal received over the single optical communication channel and determining that it is a modulation signal for modulating light emission from the light source in response to light received in the camera;

(c) generating a light initiation signal in response to detection of the first state change and providing the light initiation signal to the remote light source; and (d) generating a light modulation signal in response to detection of the second state change and providing the light modulation signal to the remote light source;

wherein communication between the camera and the remote light source over the single optical communication channel is exclusively unidirectional during the period between the first and second state changes in the optical signal.

21. The method of claim 20, wherein the single optical communication channel comprises a fiber optic cable.

* * * * *